(12) United States Patent
Harris et al.

(10) Patent No.: US 11,108,100 B2
(45) Date of Patent: Aug. 31, 2021

(54) BATTERY MODULE FOR VEHICLE ENERGY-STORAGE SYSTEMS

(71) Applicant: Faraday & Future Inc., Gardena, CA (US)

(72) Inventors: W. Porter Harris, Los Angeles, CA (US); Blake Rosengren, Hermosa Beach, CA (US); Nicholas John Sampson, Rancho Palos Verdes, CA (US)

(73) Assignee: Faraday & Future Inc., Gardena, CA (US)

( * ) Notice: Subject to any disclaimer, the term of this patent is extended or adjusted under 35 U.S.C. 154(b) by 851 days.

(21) Appl. No.: 14/946,699

(22) Filed: Nov. 19, 2015

(65) Prior Publication Data

US 2017/0005384 A1    Jan. 5, 2017

Related U.S. Application Data

(63) Continuation-in-part of application No. 14/841,617, filed on Aug. 31, 2015.
(Continued)

(51) Int. Cl.
*H01M 10/6557* (2014.01)
*H01M 2/10* (2006.01)
(Continued)

(52) U.S. Cl.
CPC .......... *H01M 10/6557* (2015.04); *F28D 1/00* (2013.01); *H01M 10/613* (2015.04);
(Continued)

(58) Field of Classification Search
CPC F28D 1/00; F28D 2021/0043; H01M 10/613; H01M 10/625; H01M 10/643;
(Continued)

(56) References Cited

U.S. PATENT DOCUMENTS 5,879,833 A     3/1999  Yoshii et al.
8,057,928 B2   11/2011  Kohn et al.
(Continued)

FOREIGN PATENT DOCUMENTS

EP    2270918    1/2011
EP    2482362    8/2012
(Continued)

OTHER PUBLICATIONS

Office Action in U.S. Appl. No. 14/866,907, dated Jan. 10, 2017.
(Continued)

*Primary Examiner* — Lingwen R Zeng
(74) *Attorney, Agent, or Firm* — Knobbe Martens Olson & Bear LLP

(57) ABSTRACT

Provided are battery modules. Each module may comprise an enclosure having a base, the base having a plurality of first holes disposed therein, the enclosure including a coolant input port, a coolant output port; the enclosure having a coolant sub-system for circulating coolant being directed into the enclosure through the coolant input port and the plurality of first holes and out of the enclosure through the coolant output port; a center divider affixed to the enclosure; a module cover coupled to the enclosure at an opposite end of the module from the center divider; a retainer disposed within the enclosure and configured to support a plurality of cells; a current carrier disposed between the module cover and the retainer; and the plurality of cells disposed between the current carrier and the center divider, the cells being coupled to and supported by the retainer.

13 Claims, 20 Drawing Sheets

Related U.S. Application Data

(60) Provisional application No. 62/186,977, filed on Jun. 30, 2015.

(51) Int. Cl.
  *H01M 10/6567* (2014.01)
  *H01M 10/613* (2014.01)
  *H01M 10/625* (2014.01)
  *F28D 1/00* (2006.01)
  *H01M 10/656* (2014.01)
  *H01M 50/20* (2021.01)
  *H01M 10/643* (2014.01)
  *F28D 21/00* (2006.01)

(52) U.S. Cl.
  CPC ....... *H01M 10/625* (2015.04); *H01M 10/656* (2015.04); *H01M 10/6567* (2015.04); *H01M 50/20* (2021.01); *F28D 2021/0043* (2013.01); *H01M 10/643* (2015.04); *H01M 2220/20* (2013.01); *Y02E 60/10* (2013.01)

(58) Field of Classification Search
  CPC ........... H01M 10/6557; H01M 10/656; H01M 10/6567; H01M 2220/20; H01M 2/1077; H01M 50/20; Y02E 60/10
  See application file for complete search history.

(56) References Cited

U.S. PATENT DOCUMENTS

| | | |
|---|---|---|
| 2001/0046624 A1 | 11/2001 | Goto et al. |
| 2008/0138698 A1 | 6/2008 | Ogami et al. |
| 2008/0268328 A1* | 10/2008 | Lee ................. H01M 2/105 429/83 |
| 2009/0023059 A1 | 1/2009 | Kinoshita et al. |
| 2009/0191452 A1* | 7/2009 | Anantharaman ....... H01M 6/42 429/120 |
| 2009/0211277 A1 | 8/2009 | Rummel et al. |
| 2009/0220852 A1 | 9/2009 | Fujii |
| 2009/0274952 A1 | 11/2009 | Wood et al. |
| 2009/0297892 A1 | 12/2009 | Ijaz et al. |
| 2010/0047682 A1 | 2/2010 | Houchin-Miller et al. |
| 2010/0285346 A1 | 11/2010 | Graban et al. |
| 2010/0297486 A1* | 11/2010 | Fujii ................. H01M 10/625 429/120 |
| 2011/0045334 A1 | 2/2011 | Meintschel et al. |
| 2011/0059346 A1 | 3/2011 | Jeong et al. |
| 2011/0097617 A1 | 4/2011 | Gu et al. |
| 2011/0135975 A1 | 6/2011 | Fuhr et al. |
| 2011/0294000 A1* | 12/2011 | Kim .................. H01M 2/1077 429/176 |
| 2012/0177970 A1* | 7/2012 | Marchio ........... H01M 10/6557 429/120 |
| 2012/0177971 A1 | 7/2012 | Cicero et al. |
| 2012/0183930 A1 | 7/2012 | Schaefer et al. |
| 2013/0157102 A1 | 6/2013 | Nagamatsu et al. |
| 2013/0306353 A1 | 11/2013 | Zhao |
| 2013/0344362 A1 | 12/2013 | Raisch et al. |
| 2014/0162106 A1* | 6/2014 | Fuerstner ............ H01M 10/625 429/120 |
| 2014/0335381 A1 | 11/2014 | Krolak |
| 2015/0188203 A1 | 7/2015 | Enomoto et al. |
| 2015/0194713 A1 | 7/2015 | Jin et al. |
| 2016/0172727 A1 | 6/2016 | Chan et al. |

FOREIGN PATENT DOCUMENTS

| | | |
|---|---|---|
| EP | 2738833 | 6/2014 |
| WO | WO 2007/047317 | 4/2007 |
| WO | WO 2008/109764 | 9/2008 |
| WO | WO 2011/149868 | 12/2011 |
| WO | WO 2013/056877 | 4/2013 |
| WO | WO 2013/155700 | 10/2013 |
| WO | WO 2015/041149 | 3/2015 |

OTHER PUBLICATIONS

Written Opinion in International Application No. PCT/US2016/039884, dated Oct. 19, 2016.
Office Action in U.S. Appl. No. 14/841,617, dated Jun. 10, 2016.

* cited by examiner

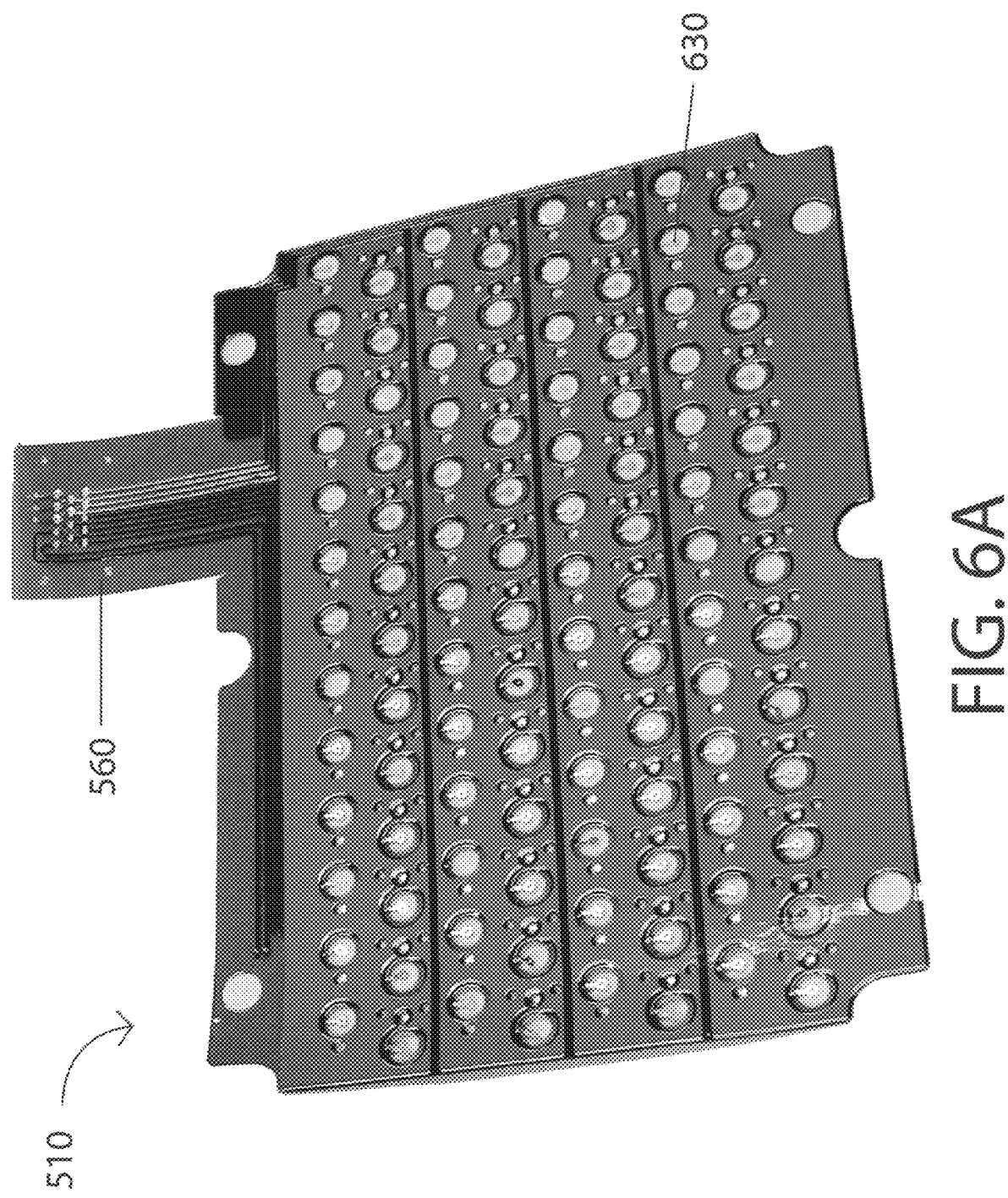

BATTERY MODULE FOR VEHICLE ENERGY-STORAGE SYSTEMS

CROSS-REFERENCE TO RELATED APPLICATION

This application is a continuation-in-part of U.S. patent application Ser. No. 14/841,617, filed on Aug. 31, 2015, which claims the benefit of U.S. Provisional Application No. 62/186,977, filed on Jun. 30, 2015. The subject matter of the aforementioned applications is incorporated herein by reference for all purposes.

FIELD

The present application relates generally to energy-storage systems, and more specifically to energy-storage systems for vehicles.

BACKGROUND

It should not be assumed that any of the approaches described in this section qualify as prior art merely by virtue of their inclusion in this section.

Electric-drive vehicles offer a solution for reducing the impact of fossil-fuel engines on the environment and transforming automotive mobility into a sustainable mode of transportation. Energy-storage systems are essential for electric-drive vehicles, such as hybrid electric vehicles, plug-in hybrid electric vehicles, and all-electric vehicles. However, present energy-storage systems have disadvantages including large size, inefficiency, and poor safety, to name a few. Similar to many sophisticated electrical systems, heat in automotive energy-storage systems should be carefully managed. Current thermal management schemes consume an inordinate amount of space. Present energy-storage systems also suffer from inefficiencies arising variously from imbalance among battery cells and resistance in various electrical connections. In addition, current energy-storage systems are not adequately protected from forces such as crash forces encountered during a collision.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to various embodiments, the present disclosure may be directed to battery modules comprising: an enclosure having a base, the base having a plurality of first holes disposed therein, the enclosure including a coolant input port, a coolant output port; the enclosure having a coolant sub-system for circulating coolant being directed into the enclosure through the coolant input port and the plurality of first holes and out of the enclosure through the coolant output port; a center divider affixed to the enclosure; a module cover coupled to the enclosure at an opposite end of the module from the center divider; a retainer disposed within the enclosure and configured to support a plurality of cells; a current carrier disposed between the module cover and the retainer; and the plurality of cells disposed between the current carrier and the center divider, the cells being coupled to and supported by the retainer.

According to some embodiments, the present disclosure can be directed to an energy-storage systems for vehicles comprising: a plurality of modules fluidly communicating with each other, each module including: an enclosure including a base, the base having a plurality of holes disposed therein, the enclosure including a coolant input port, a coolant output port, and a power connector; the enclosure having a coolant sub-system for circulating coolant being directed into the enclosure through the coolant input port and the plurality of holes and out of the enclosure through the coolant output port; a blast plate coupled to the base of the enclosure; a module cover disposed at an opposite end of the module from the blast plate; a retainer disposed within the enclosure and configured to support a plurality of cells; a current carrier disposed between the module cover and the retainer and electrically coupled to the power connector; and the plurality of cells disposed in the enclosure and secured by the retainer and the base, electrical connections being formed between the plurality of cells and the current carrier.

According to various embodiments, the present disclosure may be directed to energy-storage modules for vehicles comprising: a housing enclosing a first group of battery cells and a second group of battery cells, the housing including a coolant inlet port configured to receive coolant and a coolant outlet port configured to release coolant; and a cooling system formed within the housing between the coolant inlet port and the coolant outlet port, the cooling system is configured to separate the coolant into a first coolant flow directed to the first group of battery cells and a second coolant flow directed to the second group of battery cells, wherein the first coolant flow flows over the first group of battery cells in a first direction and the second coolant flow flows over the second group of battery cells in a second direction, and wherein the first direction and the second direction are opposite to each other.

BRIEF DESCRIPTION OF THE DRAWINGS

Embodiments are illustrated by way of example and not limitation in the figures of the accompanying drawings, in which like references indicate similar elements.

FIGS. 6A and 6B show a current carrier, according to various embodiments.

DETAILED DESCRIPTION

Figure 1:
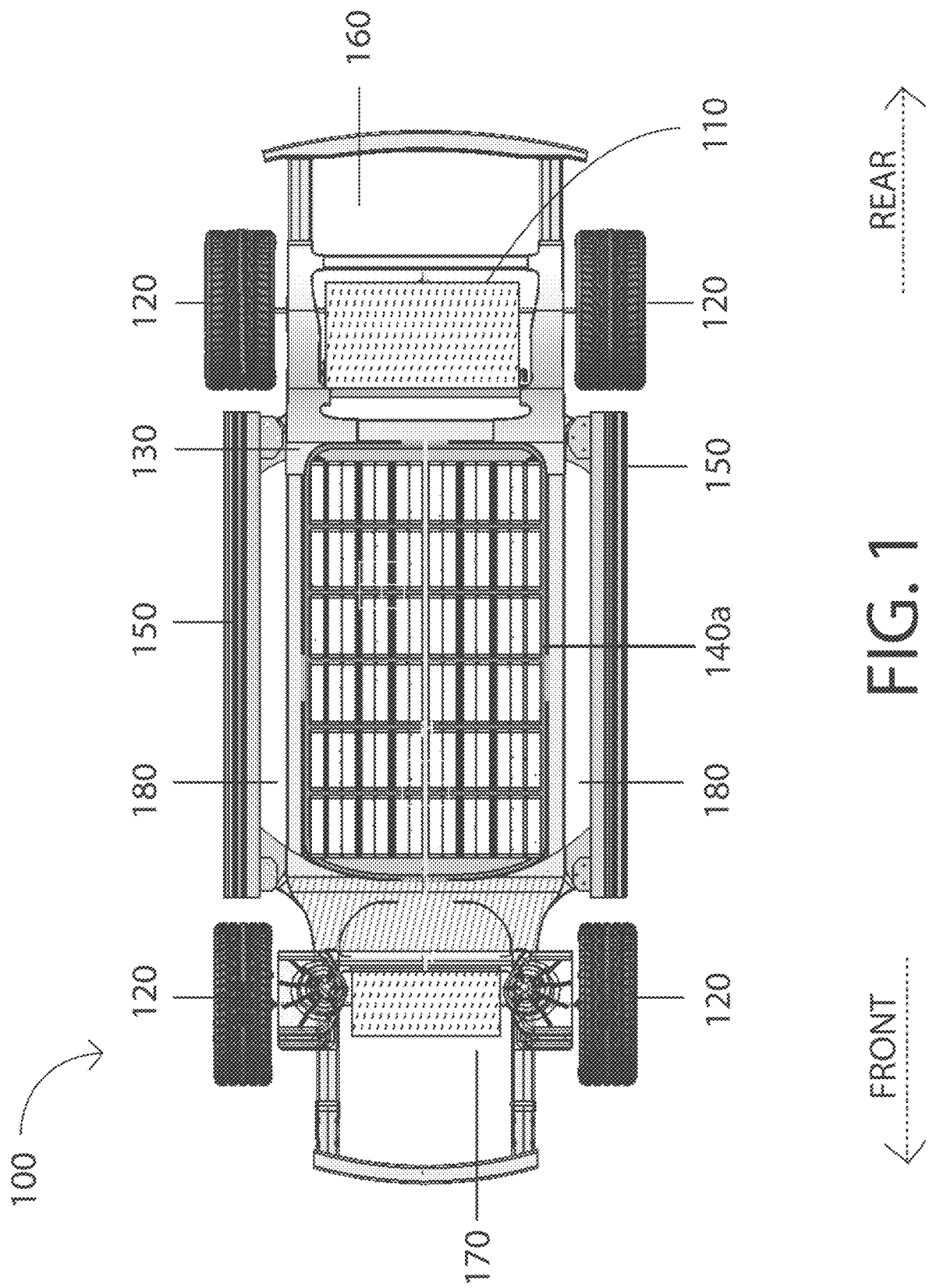
FIG. 1 illustrates an example environment in which an energy-storage system can be used.

While this technology is susceptible of embodiment in many different forms, there are shown in the drawings and will herein be described in detail several specific embodiments, with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Some embodiments of the present invention can be deployed in a wheeled, self-powered motor vehicle used for transportation, such as hybrid electric vehicles, plug-in hybrid electric vehicles, and all-electric vehicles. For example, FIG. 1 illustrates an electric car 100. Electric car 100 is an automobile propelled by one or more electric motors 110. Electric motor 110 can be coupled to one or more wheels 120 through a drivetrain (not shown in FIG. 1). Electric car 100 can include a frame 130 (also known as an underbody or chassis). Frame 130 is a supporting structure of electric car 100 to which other components can be attached/mounted, such as, for example, a battery pack 140a. Battery pack 140a can supply electricity to power one or more electric motors 110, for example, through an inverter. The inverter can change direct current (DC) from battery pack 140a to alternating current (AC), as required for electric motors 110, according to some embodiments.

As depicted in FIG. 1, battery pack 140a may have a compact "footprint" and be at least partially enclosed by frame 130 and disposed to provide a predefined separation, e.g. from structural rails 150 of an upper body that couples to frame 130. Accordingly, at least one of a rear crumple zone 160, a front crumple zone 170, and a lateral crumple zone 180 can be formed around battery pack 140a. Both the frame 130 and structural rails 150 may protect battery pack 140a from forces or impacts exerted from outside of electric car 100, for example, in a collision. In contrast, other battery packs which extend past at least one of structural rails 150, rear crumple zone 160, and front crumple zone 170 remain vulnerable to damage and may even explode in an impact.

Battery pack 140a may have a compact "footprint" such that it may be flexibly used in and disposed on frame 130 having different dimensions. Battery pack 140a can also be disposed in frame 130 to help improve directional stability (e.g., yaw acceleration). For example, battery pack 140a can be disposed in frame 130 such that a center of gravity of electric car 100 is in front of the center of the wheelbase (e.g., bounded by a plurality of wheels 120).

Figure 2A:
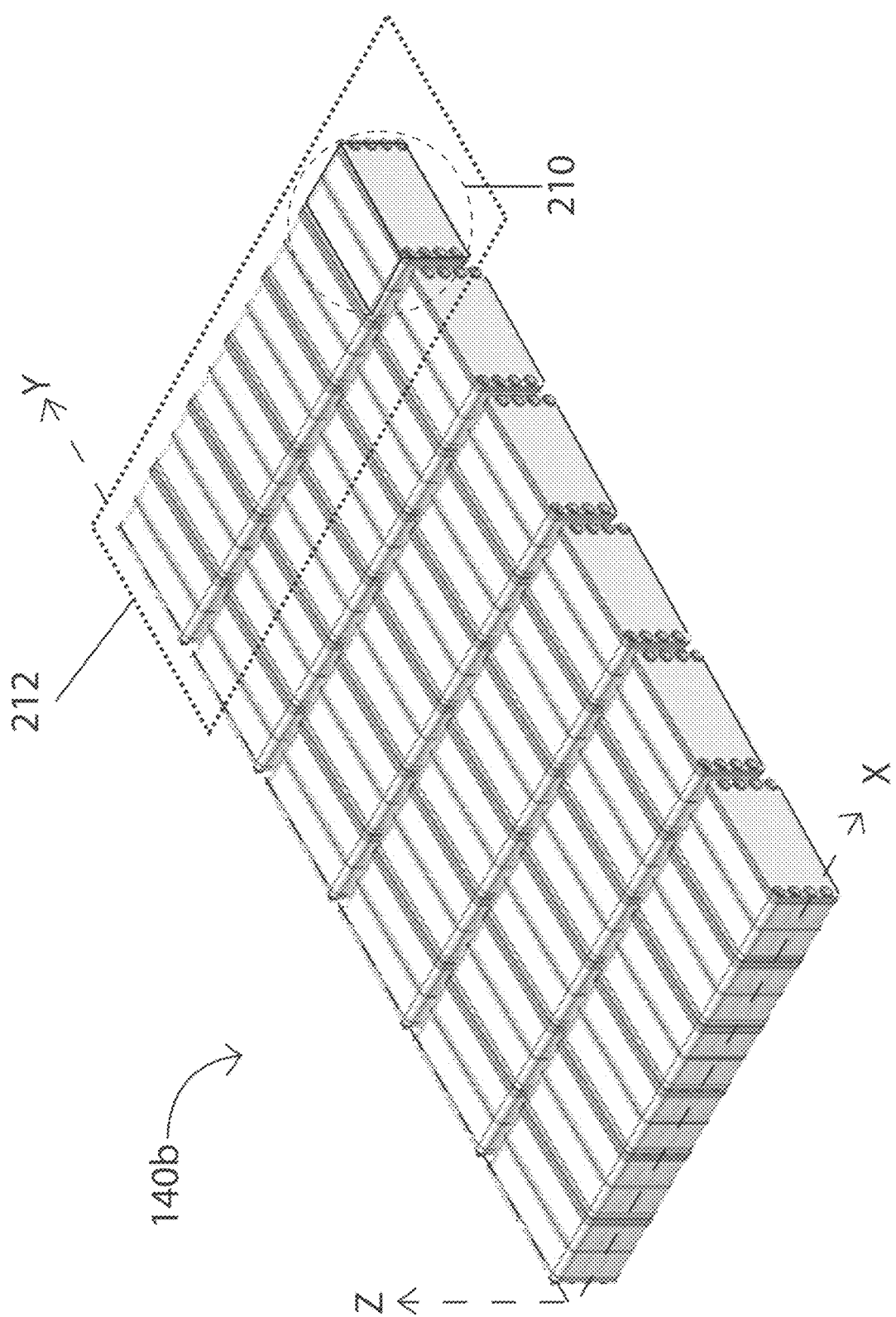
FIG. 2A shows an orientation of battery modules in an energy-storage system, according to various embodiments of the present disclosure.

FIG. 2A shows a battery pack 140b with imaginary x-, y-, and z-axis superimposed, according to various embodiments. Battery pack 140b can include a plurality of battery modules 210. In the non-limiting example, battery pack 140b can be approximately 1000 mm wide (along x-axis), 1798 mm long (along y-axis), and 152 mm high (along z-axis), and can include 36 of battery modules 210.

Figure 2B:
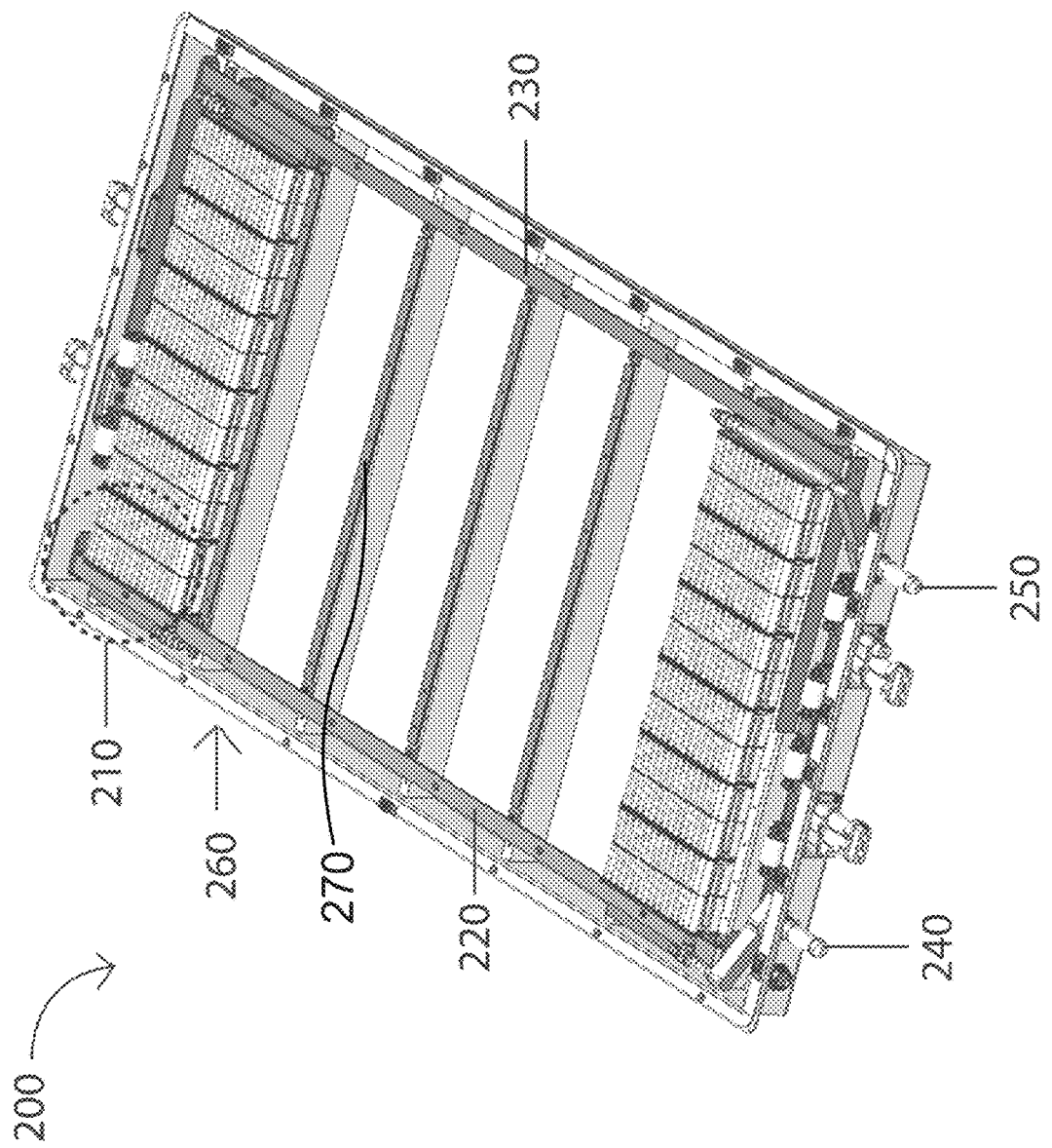
FIG. 2B depicts a bottom part of an enclosure of a partial battery pack such as shown in FIG. 2A.

FIG. 2B illustrates an exemplary enclosure 200 for battery pack 140b having a cover removed for illustrative purposes. Enclosure 200 includes tray 260 and a plurality of battery modules 210. The tray 260 may include a positive bus bar 220 and a negative bus bar 230. Positive bus bar 220 can be electrically coupled to a positive (+) portion of a power connector of each battery module 210. Negative bus bar 230 can be electrically coupled to a negative (−) portion of a power connector of each battery module 210. Positive bus bar 220 is electrically coupled to a positive terminal 240 of enclosure 200. Negative bus bar 230 can be electrically coupled to a negative terminal 250 of enclosure 200. As described above with reference to FIG. 1, because bus bars 220 and 230 are within structural rails 150, they can be protected from collision damage.

According to some embodiments, negative bus bar 230 and positive bus bar 220 are disposed along opposite edges of tray 260 to provide a predefined separation between negative bus bar 230 and positive bus bar 220. Such separation between negative bus bar 230 and positive bus bar 220 can prevent or at least reduce the possibility of a short circuit (e.g., of battery pack 140b) due to a deformity caused by an impact.

As will be described further in more detail with reference to FIG. 5, battery module 210 can include at least one battery cell (details not shown in FIG. 2A, see FIG. 7). The at least one battery cell can include an anode terminal, a cathode terminal, and a cylindrical body. The battery cell can be disposed in each of battery module 210 such that a surface of the anode terminal and a surface of the cathode terminal are normal to the imaginary x-axis referenced in FIG. 2A (e.g., the cylindrical body of the battery cell is parallel to the imaginary x-axis). This can be referred to as an x-axis cell orientation.

In the event of fire and/or explosion in one or more of battery modules 210, the battery cells can be vented along the x-axis, advantageously minimizing a danger and/or a harm to a driver, passenger, cargo, and the like, which may be disposed in electric car 100 above battery pack 140b (e.g., along the z-axis), in various embodiments.

The x-axis cell orientation of battery modules 210 in battery pack 140b shown in FIGS. 2A and 2B can be advantageous for efficient electrical and fluidic routing to each of battery module 210 in battery pack 140b. For example, at least some of battery modules 210 can be electrically connected in a series forming string 212, and two or more of string 212 can be electrically connected in parallel. This way, in the event one of string 212 fails, others of string 212 may not be affected, according to various embodiments.

Figure 3:
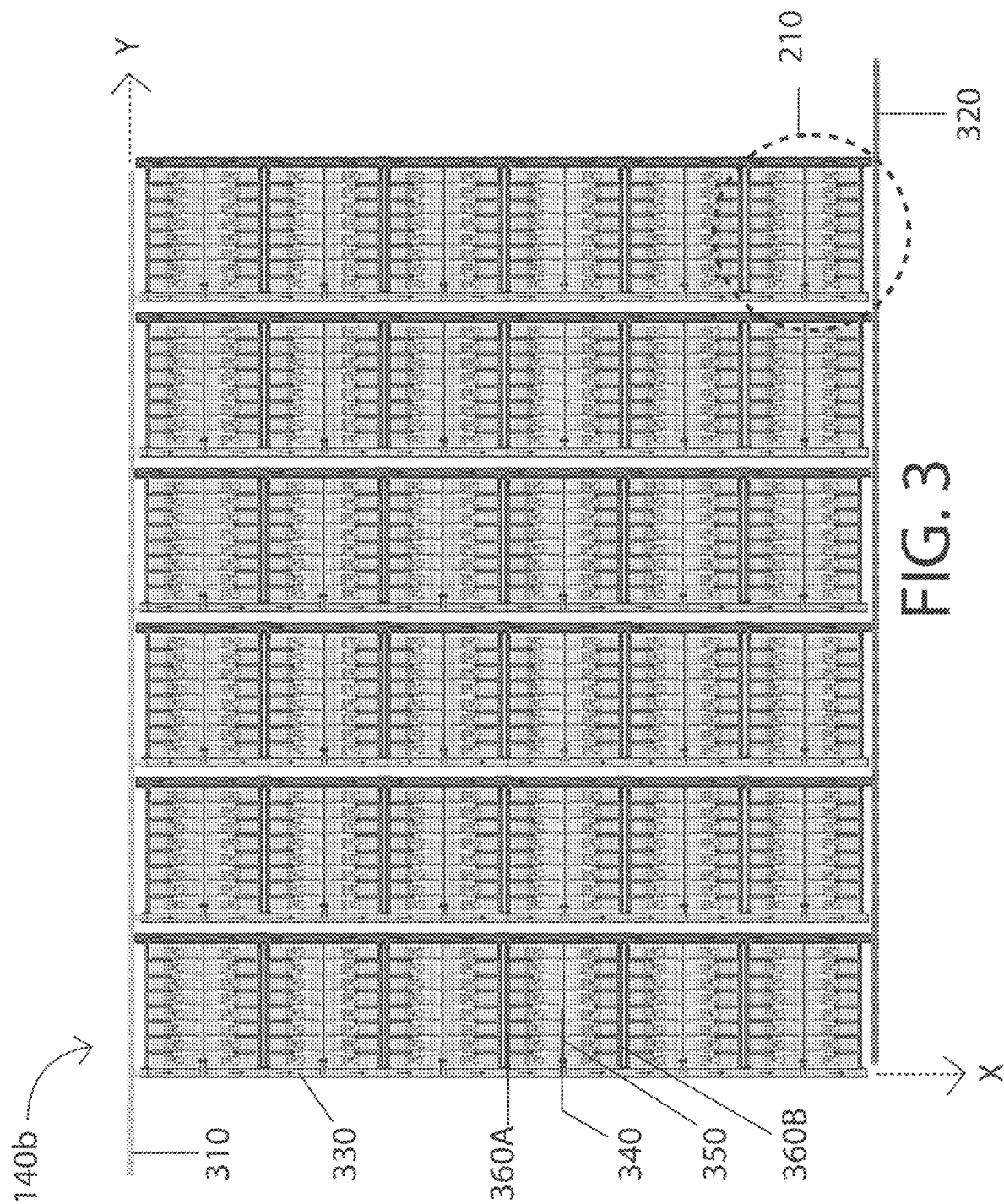
FIG. 3 is a simplified diagram illustrating coolant flows, according to example embodiments.

FIG. 3 illustrates coolant flows and operation of a coolant system and a coolant sub-system according to various embodiments. As shown in FIG. 3, the x-axis cell orientation can be advantageous for routing coolant (cooling fluid) in parallel to each of battery modules 210 in battery pack 140b. Coolant can be pumped into battery pack 140b at ingress 310 and pumped out of battery pack 140b at egress 320. A resulting pressure gradient within battery pack 140b can provide sufficient circulation of coolant to minimize a temperature gradient within battery pack 140b (e.g., a temperature gradient within one of battery modules 210, a temperature gradient between battery modules 210, and/or a temperature gradient between two or more of string 212 shown in FIG. 2A).

Within battery pack 140b, the coolant system may circulate the coolant, for example, to battery modules 210 (e.g., the circulation is indicated by reference numeral 330). One or more additional pumps (not shown in FIG. 3) can be used to maintain a roughly constant pressure between multiple battery modules 210 connected in series (e.g., in string 212 in FIG. 2A) and between such strings. Within each battery module 210, the coolant sub-system may circulate the coolant, for example, between and within two half modules 410 and 420 shown in FIG. 4 (e.g., the circulation indicated by reference numeral 340). In some embodiments, the coolant can enter each battery module 210 through an interface 350 between two half modules 410 and 420, in a direction (e.g., along the y- or z-axis) perpendicular to the cylindrical body of each battery cell, and flow to each cell. Driven by pressure within the coolant system, the coolant then can flow along the cylindrical body of each battery (e.g., along the x-axis) and may be collected at the two (opposite) side surfaces 360A and 360B of the module that can be normal to the x-axis. In this way, heat can be efficiently managed/dissipated and thermal gradients minimized among all battery cells in battery pack 140b, such that a temperature may be maintained at an approximately uniform level.

In some embodiments, parallel cooling, as illustrated in FIG. 3, can maintain temperature among battery cells in battery pack 140b at an approximately uniform level such that a direct current internal resistance (DCIR) of each battery cell is maintained at an substantially predefined resistance. The DCIR can vary with a temperature, therefore, keeping each battery cell in battery pack 140b at a substantially uniform and predefined temperature can result in each battery cell having substantially the same DCIR. Since a voltage across each battery cell can be reduced as a function of its respective DCIR, each battery cell in battery pack 140b may experience substantially the same loss in voltage. In this way, each battery cell in battery pack 140b can be maintained at approximately the same capacity and imbalances between battery cells in battery pack 140b can be minimized.

In some embodiments, when compared to techniques using metal tubes to circulate coolant, parallel cooling can enable higher battery cell density within battery module 210 and higher battery module density in battery pack 140b. In some embodiments, coolant or cooling fluid may be at least one of the following: synthetic oil, water and ethylene glycol (WEG), poly-alpha-olefin (or poly-α-olefin, also abbreviated as PAO) oil, liquid dielectric cooling based on phase change, and the like. By way of further non-limiting example, the coolant may be at least one of: perfluorohexane (Flutec PP1), perfluoromethylcyclohexane (Flutec PP2), Perfluoro-1,3-dimethylcyclohexane (Flutec PP3), perfluorodecalin (Flutec PP6), perfluoromethyldecalin (Flutec PP9), trichlorofluoromethane (Freon 11), trichlorotrifluoroethane (Freon 113), methanol (methyl alcohol 283-403K), ethanol (ethyl alcohol 273-403K), and the like.

Figure 4:
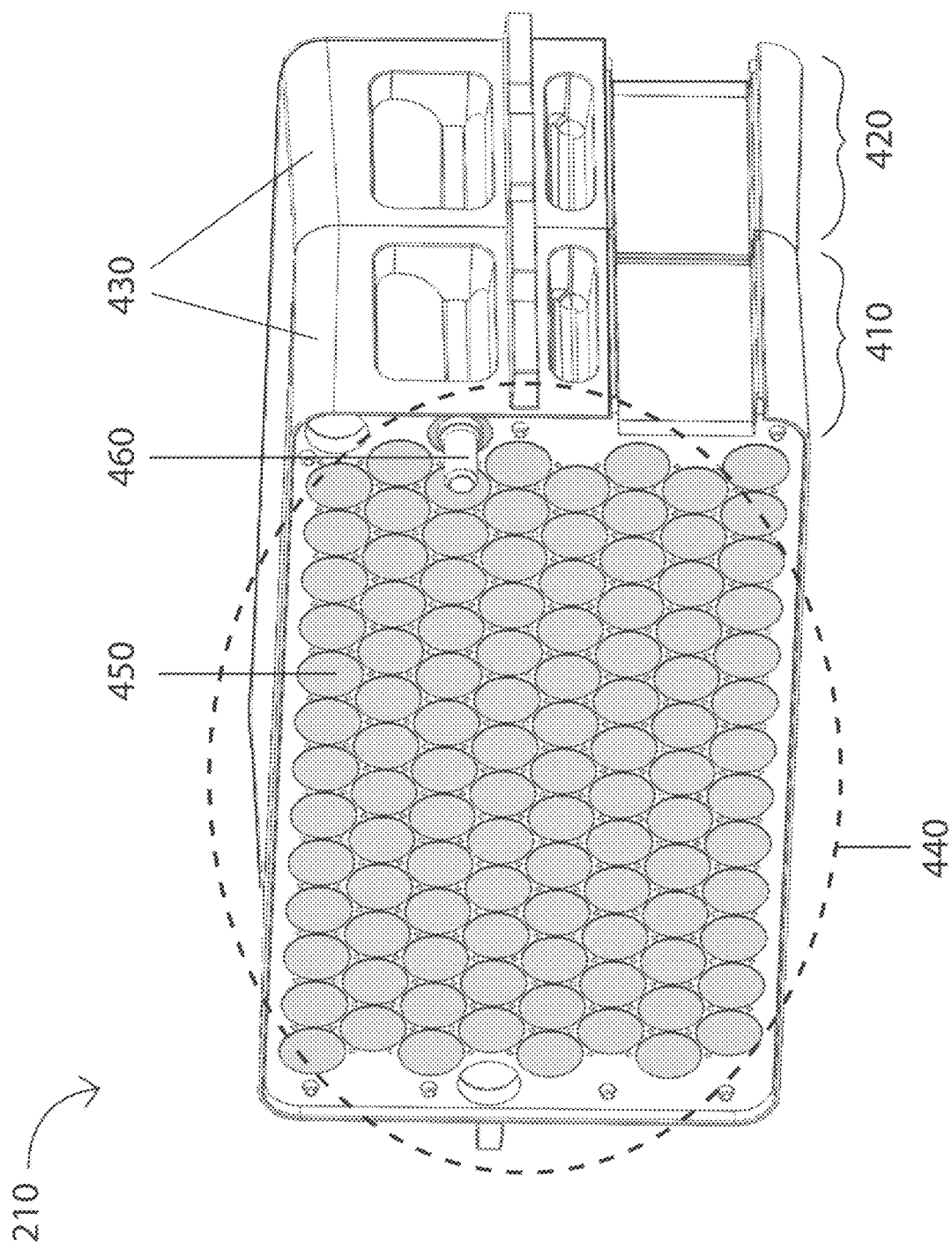
FIG. 4 is a simplified diagram of a battery module, according to various embodiments of the present disclosure.

FIG. 4 illustrates battery module 210 according to various embodiments. A main power connector 460 can provide power from battery cells 450 to outside of battery module 210. In some embodiments, battery module 210 can include two half modules 410 and 420, each having an enclosure 430. Enclosure 430 may be made using one or more plastics having sufficiently low thermal conductivities. Respective enclosures 430 of each of the two half modules 410 and 420 may be coupled with each other to form the housing for battery module 210.

FIG. 4 includes a view 440 of enclosure 430 (e.g., with a cover removed). For each of half modules 410, 420 there is shown a plurality of battery cells 450 oriented (mounted) horizontally (see also FIG. 5 and FIG. 8). By way of non-limiting example, each half module includes one hundred four of battery cells 450. By way of further non-limiting example, eight of battery cells 450 are electrically connected in a series (e.g., the staggered column of eight battery cells 450 shown in FIG. 4), with a total of thirteen of such groups of eight battery cells 450 electrically connected in series. By way of additional non-limiting example, the thirteen groups (e.g., staggered columns of eight battery cells 450 electrically coupled in series) are electrically connected in parallel. This example configuration may be referred to as "8S13P" (8 series, 13 parallel). In some embodiments, the 8S13P electrical connectivity can be provided by current carrier 510, described further below in relation to FIGS. 5 and 6. Other combinations and permutations of battery cells 450 electrically coupled in series and/or parallel maybe used.

Figure 5:
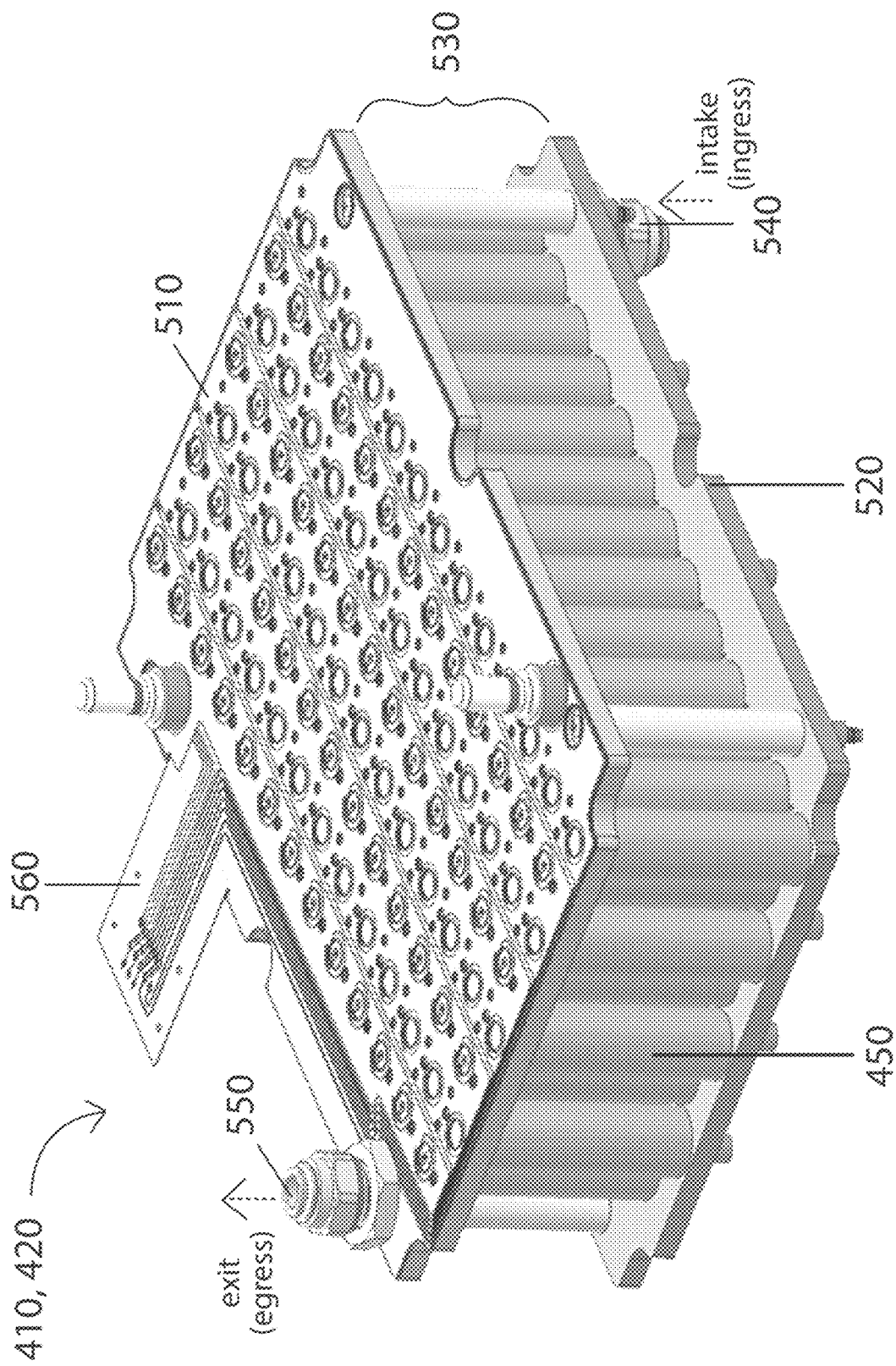
FIG. 5 illustrates a half module, in accordance with various embodiments.

FIG. 5 depicts a view of half modules 410, 420 without enclosure 430 in accordance with various embodiments. Half modules 410 and 420 need not be the same, e.g., they may be mirror images of each other in some embodiments. Half modules 410 and 420 can include a plurality of battery cells 450. The plurality of battery cells 450 can be disposed between current carrier 510 and blast plate 520 such that an exterior side of each of battery cells 450 is not in contact with the exterior sides of other (e.g., adjacent) battery cells 450. In this way, coolant can circulate among and between battery cells 450 to provide submerged, evenly distributed cooling. In addition, to save the weight associated with coolant in areas where cooling is not needed, air pockets can be formed using channels craftily designed in the space 530 between current carrier 510 and blast plate 520 not occupied by battery cells 450. Coolant can enter half modules 410, 420 through coolant intake 540, is optionally directed by one or more flow channels, circulates among and between the plurality of battery cells 450, and exits through coolant outtake 550. In some embodiments, coolant intake 540 and coolant outtake 550 can each be male or female fluid fittings. In some embodiments, coolant or cooling fluid is at least one of: synthetic oil, water and ethylene glycol (WEG), poly-alpha-olefin (or poly-α-olefin, also abbreviated as PAO) oil, liquid dielectric cooling based on phase change, and the like. By way of further non-limiting example, the coolant may be at least one of: perfluorohexane (Flutec PP1), perfluoromethylcyclohexane (Flutec PP2), Perfluoro-1,3-dimethylcyclohexane (Flutec PP3), perfluorodecalin (Flutec PP6), perfluoromethyldecalin (Flutec PP9), trichlorofluoromethane (Freon 11), trichlorotrifluoroethane (Freon 113), methanol (methyl alcohol 283-403K), ethanol (ethyl alcohol 273-403K), and the like. Compared to techniques using metal tubes to circulate coolant, submerged cooling improves a packing density of battery cells 450 (e.g., inside battery module 210 and half modules 410, 420) by 15%, in various embodiments.

Figure 6B:
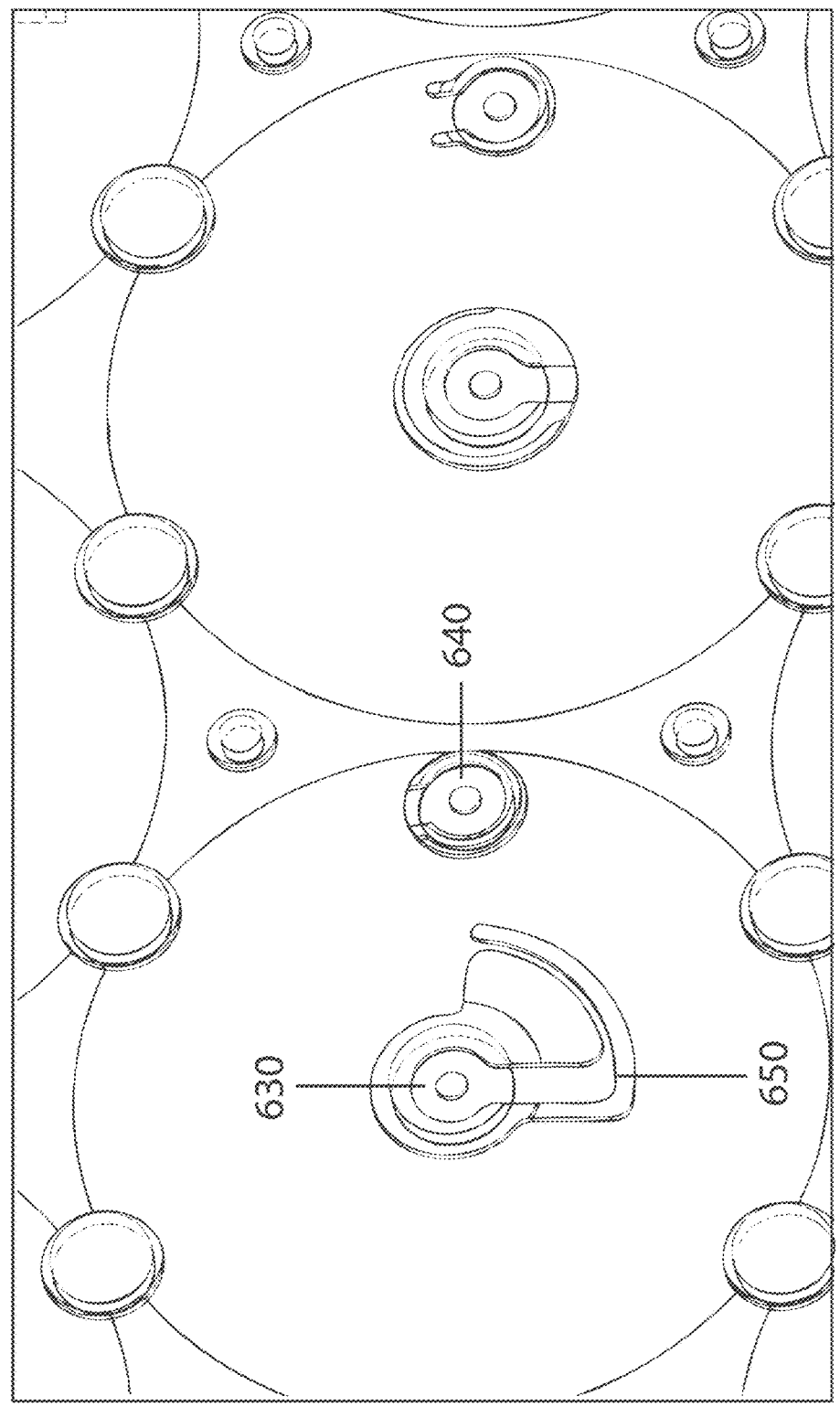

FIGS. 6A and 6B depict current carrier 510, 510A according to various embodiments. Current carrier 510, 510A is generally flat (or planar) and comprises one or more layers (not shown in FIGS. 6A and 6B), such as a base layer, a positive power plane, a negative power plane, and signal plane sandwiched in-between dielectric isolation layers (e.g., made of polyimide). In some embodiments, the signal plane can include signal traces and be used to provide battery module telemetry (e.g., battery cell voltage, current, state of charge, and temperature from optional sensors on current carrier 510) to outside of battery module 210.

As depicted in FIG. 6B, current carrier 510A can be a magnified view of a portion of current carrier 510, for illustrative purposes. Current carrier 510A can be communicatively coupled to each of battery cells 450, for example, at a separate (fused) positive (+) portion 630 and a separate negative (−) portion 640 which may be electrically coupled to the positive power plane and negative power plane (respectively) of current carrier 510A, and to each cathode and anode (respectively) of a battery cell 450. In some embodiments, positive (+) portion 630 can be laser welded to a cathode terminal of battery cell 450, and negative (−) portion 640 can be laser welded to an anode terminal of battery cell 450. In some embodiments, the laser-welded connection can have on the order of 5 milli-Ohms resistance. In contrast, electrically coupling the elements using ultrasonic bonding of aluminum bond wires can have on the order of 10 milli-Ohms resistance. Laser welding advantageously can have lower resistance for greater power efficiency and take less time to perform than ultrasonic wire bonding, which can contribute to greater performance and manufacturing efficiency.

Current carrier 510A can include a fuse 650 formed from part of a metal layer (e.g., copper, aluminum, etc.) of current carrier 510A, such as in the positive power plane. In some embodiments, the fuse 650 can be formed (e.g., laser etched) in a metal layer (e.g., positive power plane) to dimensions corresponding to a type of low-resistance resistor and acts as a sacrificial device to provide overcurrent protection. For example, in the event of thermal runaway of one of battery cell 450 (e.g., due to an internal short circuit), the fuse may "blow," breaking the electrical connection to the battery cell 450 and electrically isolating the battery cell 450 from current carrier 510A. Although an example of a fuse formed in the positive power plane is provided, a fuse may additionally or alternatively be a part of the negative power plane.

Additional thermal runaway control can be provided in various embodiments by scoring on end 740 (identified in FIG. 7) of the battery cell 450. The scoring can promote rupturing to effect venting in the event of over pressure. In various embodiments, all battery cells 450 may be oriented to allow venting into the blast plate 520 for both half modules.

In some embodiments, current carrier 510 can be comprised of a printed circuit board and a flexible printed circuit. For example, the printed circuit board may variously comprise at least one of copper, FR-2 (phenolic cotton paper), FR-3 (cotton paper and epoxy), FR-4 (woven glass and epoxy), FR-5 (woven glass and epoxy), FR-6 (matte glass and polyester), G-10 (woven glass and epoxy), CEM-1 (cotton paper and epoxy), CEM-2 (cotton paper and epoxy), CEM-3 (non-woven glass and epoxy), CEM-4 (woven glass and epoxy), and CEM-5 (woven glass and polyester). By way of further non-limiting example, the flexible printed circuit may comprise at least one of copper foil and a flexible polymer film, such as polyester (PET), polyimide (PI), polyethylene naphthalate (PEN), polyetherimide (PEI), along with various fluoropolymers (FEP), and copolymers.

In addition to electrically coupling battery cells 450 to each other (e.g., in series and/or parallel), current carrier 510 can provide electrical connectivity to outside of battery module 210, for example, through main power connector 460 (FIG. 4). Current carrier 510 may also include electrical interface 560 (FIGS. 5, 6A) which transports signals from the signal plane. Electrical interface 560 can include an electrical connector (not shown in FIGS. 5, 6A).

Figure 7:
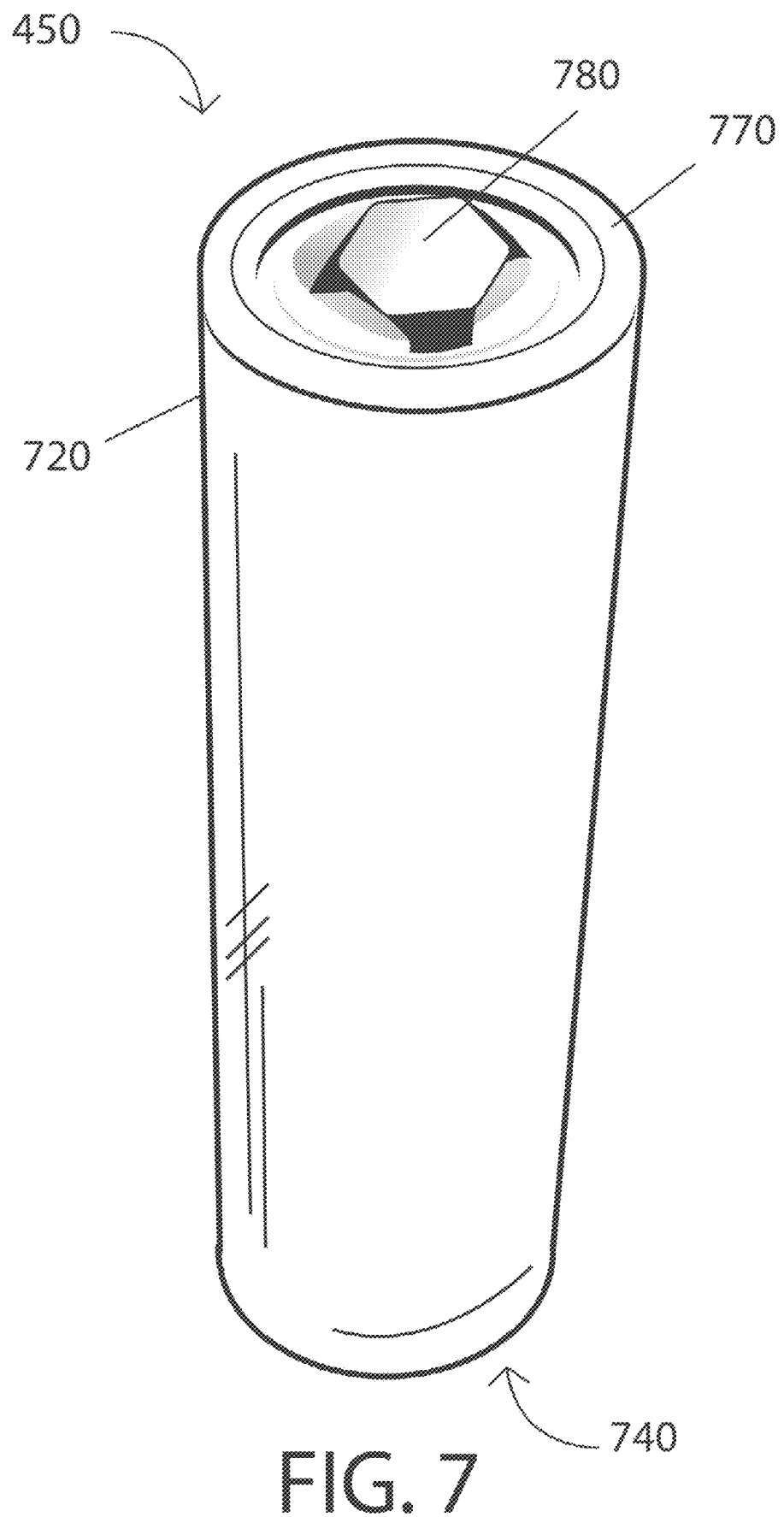
FIG. 7 depicts an example battery cell.

FIG. 7 shows battery cell 450 according to some embodiments. In some embodiments, battery cell 450 can be a lithium ion (li-ion) battery. For example, battery cell 450 may be an 18650 type li-ion battery having a cylindrical shape with an approximate diameter of 18.6 mm and approximate length of 65.2 mm. Other rechargeable battery form factors and chemistries can additionally or alternatively be used. In various embodiments, battery cell 450 may include can 720 (e.g., the cylindrical body), anode terminal 770, and cathode terminal 780. For example, anode terminal 770 can be a negative terminal of battery cell 450 and cathode terminal 780 can be a positive terminal of battery cell 450. Anode terminal 770 and cathode terminal 780 can be electrically isolated from each other by an insulator or dielectric.

Figure 8:
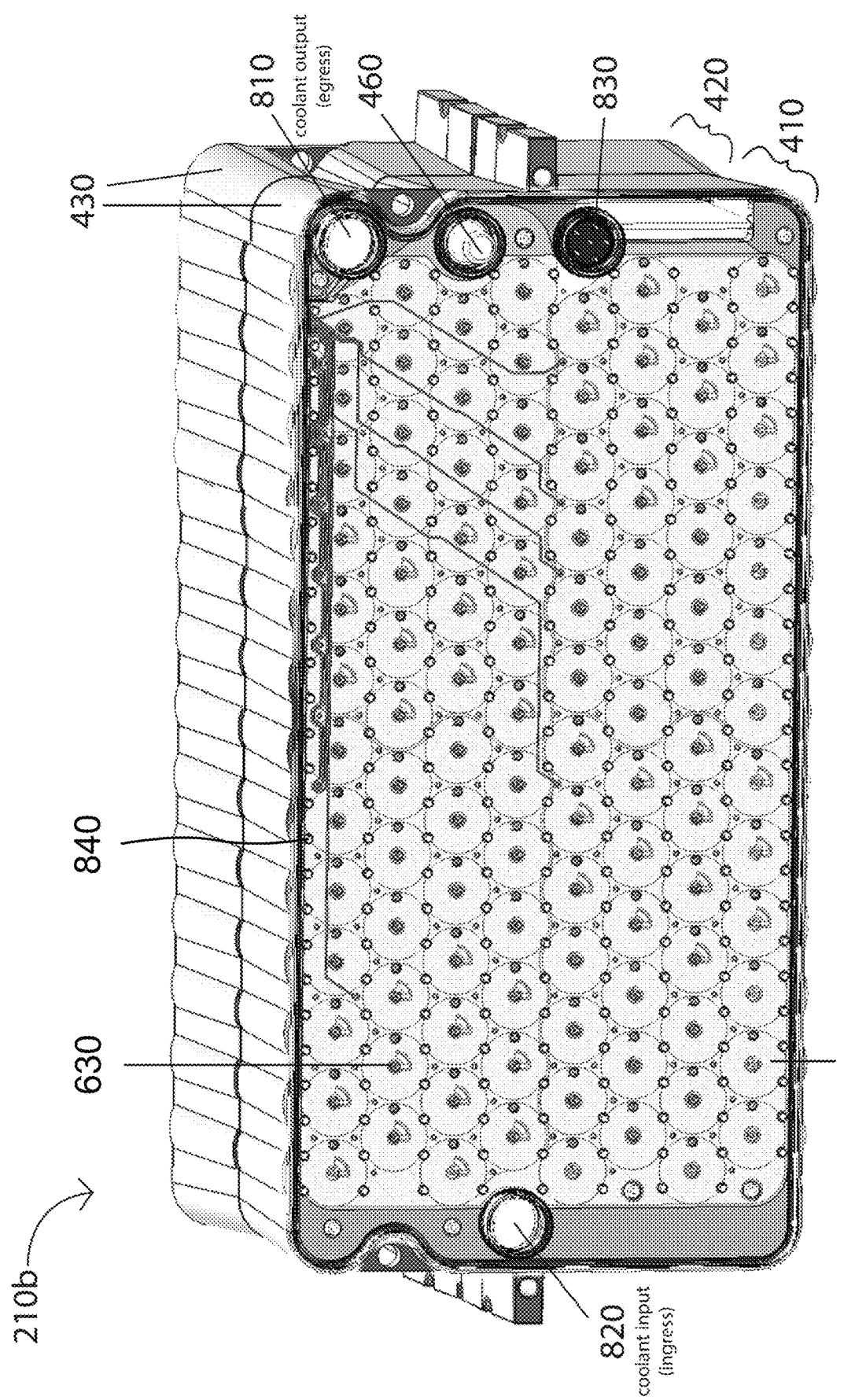
FIGS. 8 and 9 illustrate further embodiments of a battery module.

FIG. 8 illustrates another example of a battery module, battery module 210b, according to various embodiments. As described in relation to battery module 210 in FIG. 4, battery module 210b may include two half modules 410 and 420 and main power connector 460. Each of half modules 410 and 420 may include one of enclosure 430 for housing battery cells therein. Battery module 210b further depicts main coolant input port 820, main coolant output port 810, and communications and low power connector 830. Coolant can be provided to battery module 210b at main coolant input port 820, circulated within battery module 210b, and received at main coolant output port 810.

In contrast to the view of battery module 210 in FIG. 4, FIG. 8 depicts current carrier 510. Battery module 210b may include one or more staking features 840 to hold current carrier 510 in battery module 210b. For example, staking feature 840 can be a plastic stake. In some embodiments, communications and low power connector 830 can be at least partially electrically coupled to the signal plane and/or electrical interface 560 of current carrier 510, for example, through electronics for data acquisition and/or control (not shown in FIG. 8). Communications and low power connector 830 may provide low power, for example, to electronics for data acquisition and/or control, and sensors.

Figure 9:
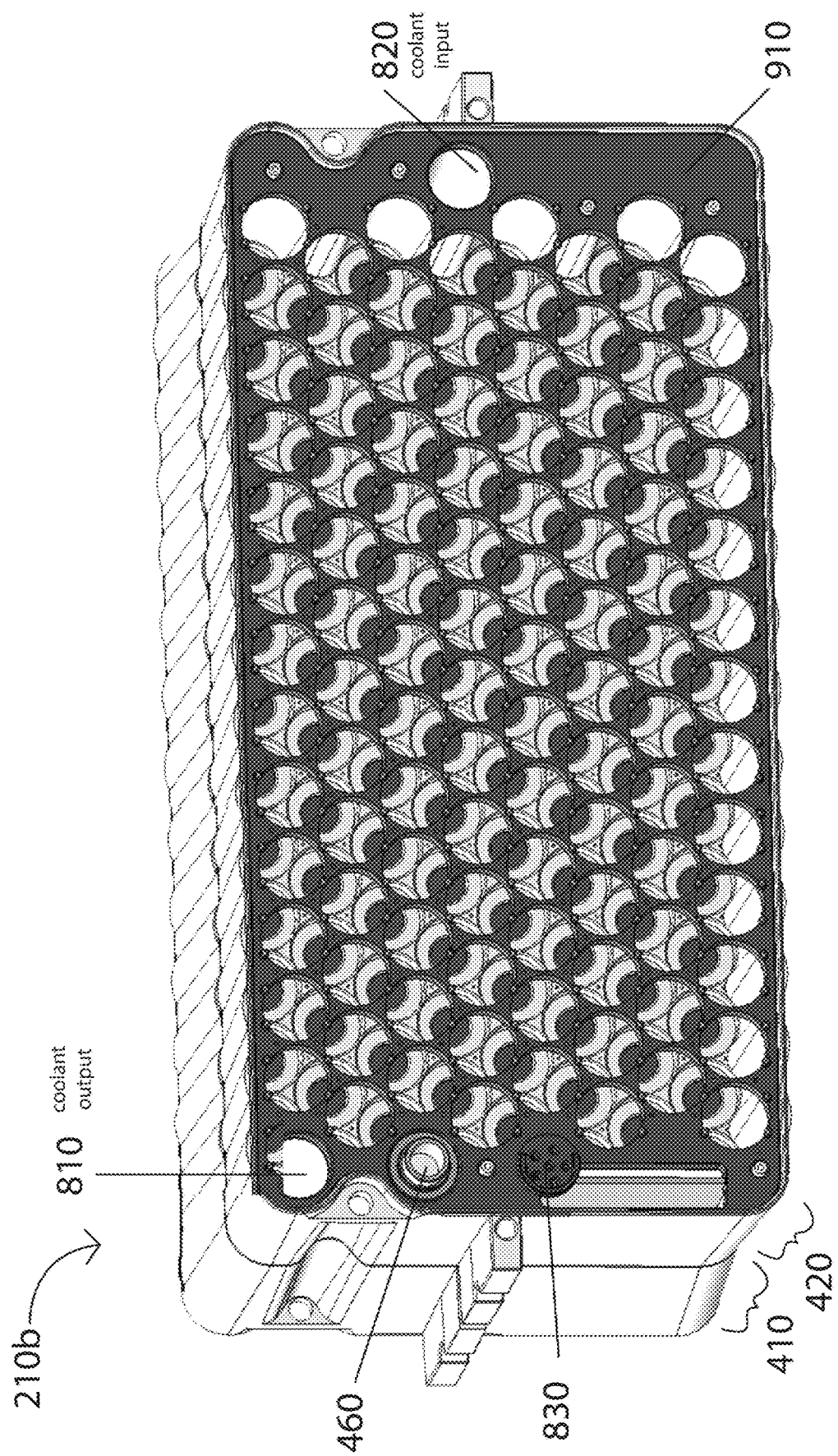

FIG. 9 shows another view of battery module 210b where the battery cells and the current carrier are removed from one of the half modules, for illustrative purposes. As described in relation to FIGS. 4 and 8, battery module 210b may include two half modules 410 and 420, main power connector 460, main coolant output port 810, main coolant input port 820, and communications and low power connector 830. Each of the half modules 410 and 420 can include an enclosure 430. Each enclosure 430 may further include plate 910 (e.g., a bracket). Plate 910 may include structures for securing the battery cells within enclosure 430 and maintaining the distance between battery cells.

Figure 10A:
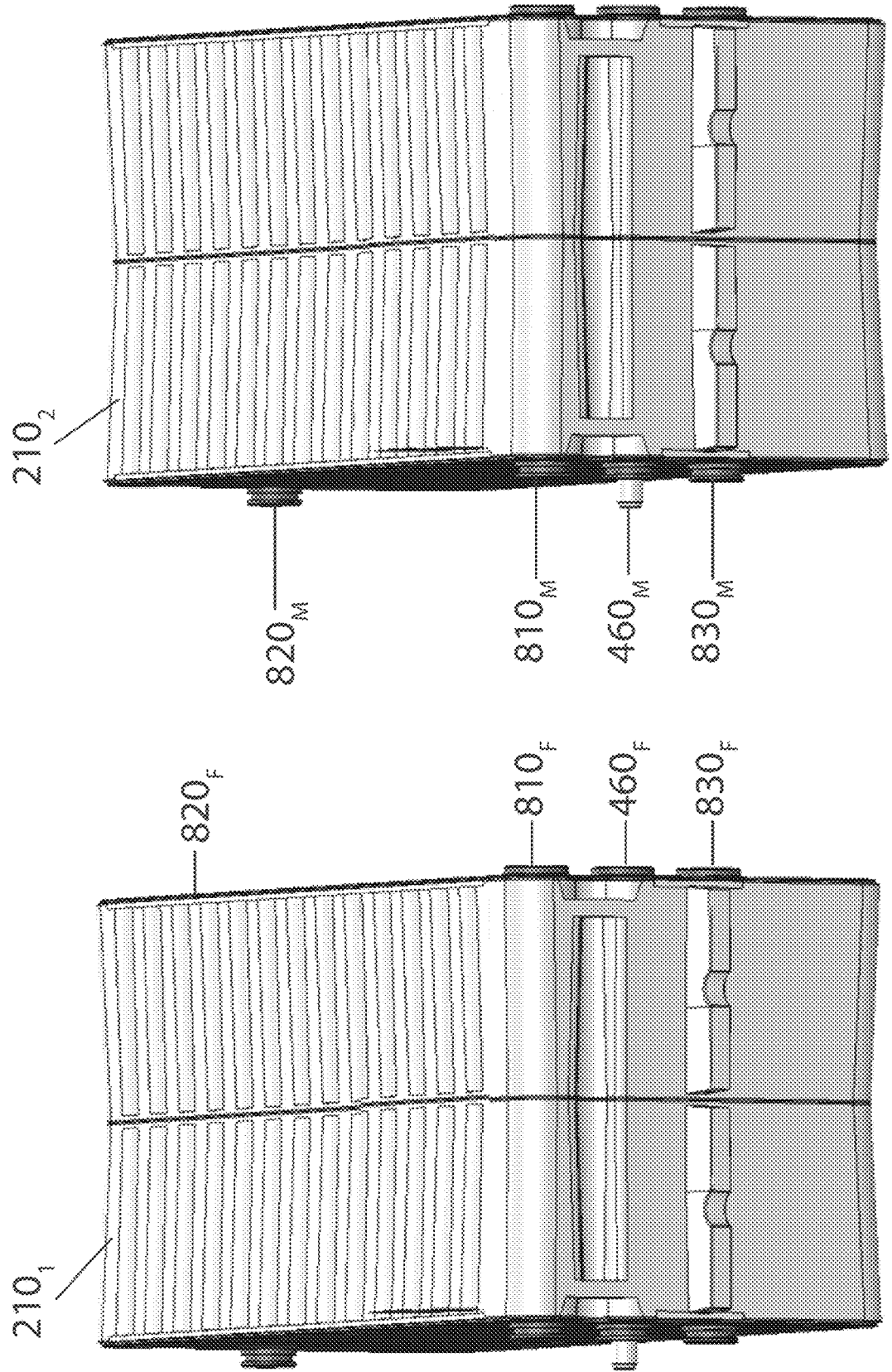
FIGS. 10A and 10B show battery module coupling, according to some embodiments.
Figure 10B:
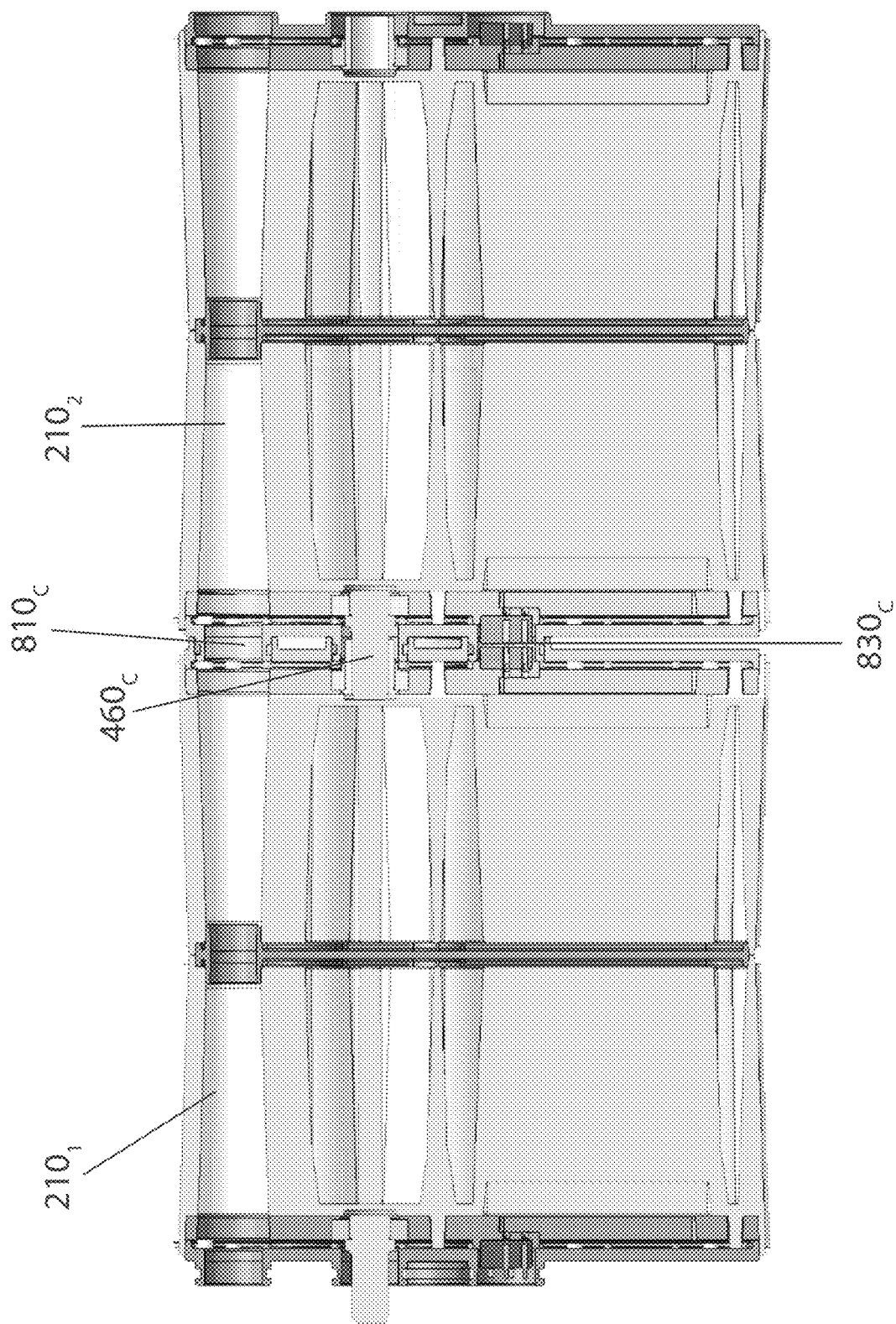

FIGS. 10A and 10B illustrate arrangement and coupling between two of battery modules 210b: $210_1$ and $210_2$. From different perspective views, FIG. 10A depicts battery modules $210_1$ and $210_2$ being apart and aligned for coupling. For example, battery modules $210_1$ and $210_2$ are positioned as shown in FIG. 10A and moved together until coupled as shown in the example in FIG. 10B. Generally, a female receptacle on one of battery modules $210_1$ and $210_2$ may receive and hold a male connector on the other of battery modules $210_2$ and $210_1$, respectively.

As shown in the example in FIG. 10A, a left side of battery modules $210_1$ and $210_2$ may have male connectors and a right side of battery modules $210_1$ and $210_2$ have female connectors, according to some embodiments. For example, the left sides of battery modules $210_1$ and $210_2$ include male main power connector $460_M$, male main coolant output port $810_M$, male main coolant input port $820_M$, and male communications and low power connector $830_M$. By way of further non-limiting example, the right sides of battery modules $210_1$ and $210_2$ can include female main power connector $460_F$, female main coolant output port $810_F$, female main coolant input port $820_F$, and female communications and low power connector $830_F$. Each of female main power connector $460_F$, female main coolant output port $810_F$, female main coolant input port $820_F$, and female communications and low power connector $830_F$ may include an (elastomer) o-ring or other seal. Other combinations and permutations of male and female connectors—such as a mix of male and female connectors on each side, and female connectors on the right side and male connectors on the left side—may be used.

FIG. 10B depicts a cross-sectional view of battery modules $210_1$ and $210_2$ of FIG. 10A coupled together. For example, male main power connector $460_M$ and female main power connector $460_F$ (FIG. 10A) can combine to form coupled main power connectors $460_C$, male main coolant output port $810_M$ and female main coolant output port $810_F$ can combine to form coupled main coolant output ports $810_C$, male main coolant input port $820_M$ and female main coolant input port $820_F$ can combine to form coupled main coolant input ports $820_C$ (not shown in FIG. 10B), and female communications and low power connector $830_F$ and male communications and low power connector $830_M$ can combine to form coupled communications and low power connectors $830_C$. As a result, the internal cooling channels or manifolds of the battery modules can be connected through the coupling between the modules, forming the cooling system schematically illustrated in FIG. 3.

Figure 11:
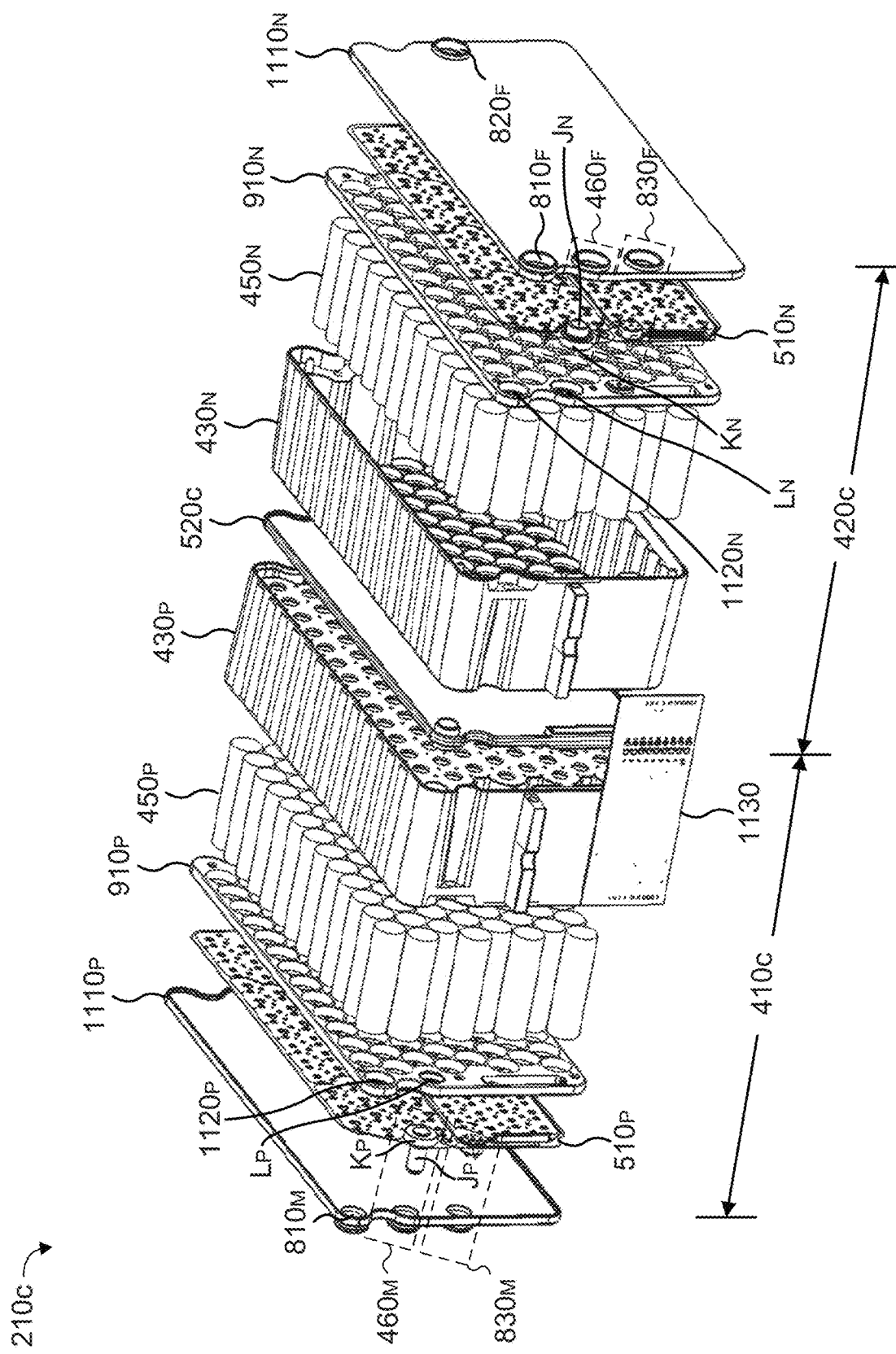
FIG. 11 depicts an exploded view of a battery module, in accordance with various embodiments.

FIG. 11 shows an exploded view of battery module $210_C$ according to some embodiments. As described in relation to battery module 210 in FIGS. 4 and 210b in FIG. 8, battery module $210_C$ can include two half modules $410_C$ and $420_C$. Half modules $410_C$ and $420_C$ can be coupled together as was described in relation to FIG. 10B.

Half module $410_C$ can be a three-dimensional mirror image of half module $420_C$, and vice-versa. Half modules $410_C$ and $420_C$ can each include half shell $430_P$ and $430_N$, battery cells $450_P$ and $450_N$, cell retainer $910_P$ and $910_N$, flexible circuit $510_P$ and $510_N$, and module cover $1110_P$ and $1110_N$, respectively. Half shells $430_P$ and $430_N$ were described in relation to enclosures 430 in FIGS. 4, 8, and 9. Battery cells $450_P$ and $450_N$ were described in relation to battery cells 450 in FIGS. 4, 5, and 7. Cell retainers $910_P$ and $910_N$ were described in relation to plate 910 in FIG. 9. Flexible circuits $510_P$ and $510_N$ were described in relation to current carrier 910 in FIG. 9. Center divider $520_C$ was described in relation to blast plate 520 in FIG. 5.

In some embodiments, battery module $210_C$ can include telemetry module 1130. Telemetry module 1130 was described above in relation to electronics for data acquisition and/or control, and sensors (FIG. 8). Telemetry module 1130 can be communicatively coupled to flexible circuit $510_P$ and/or $510_N$. Additionally or alternatively, telemetry module 1130 can be communicatively coupled to male communications and low power connector $830_M$ and/or female communications and low power connector $830_F$.

Figure 12A:
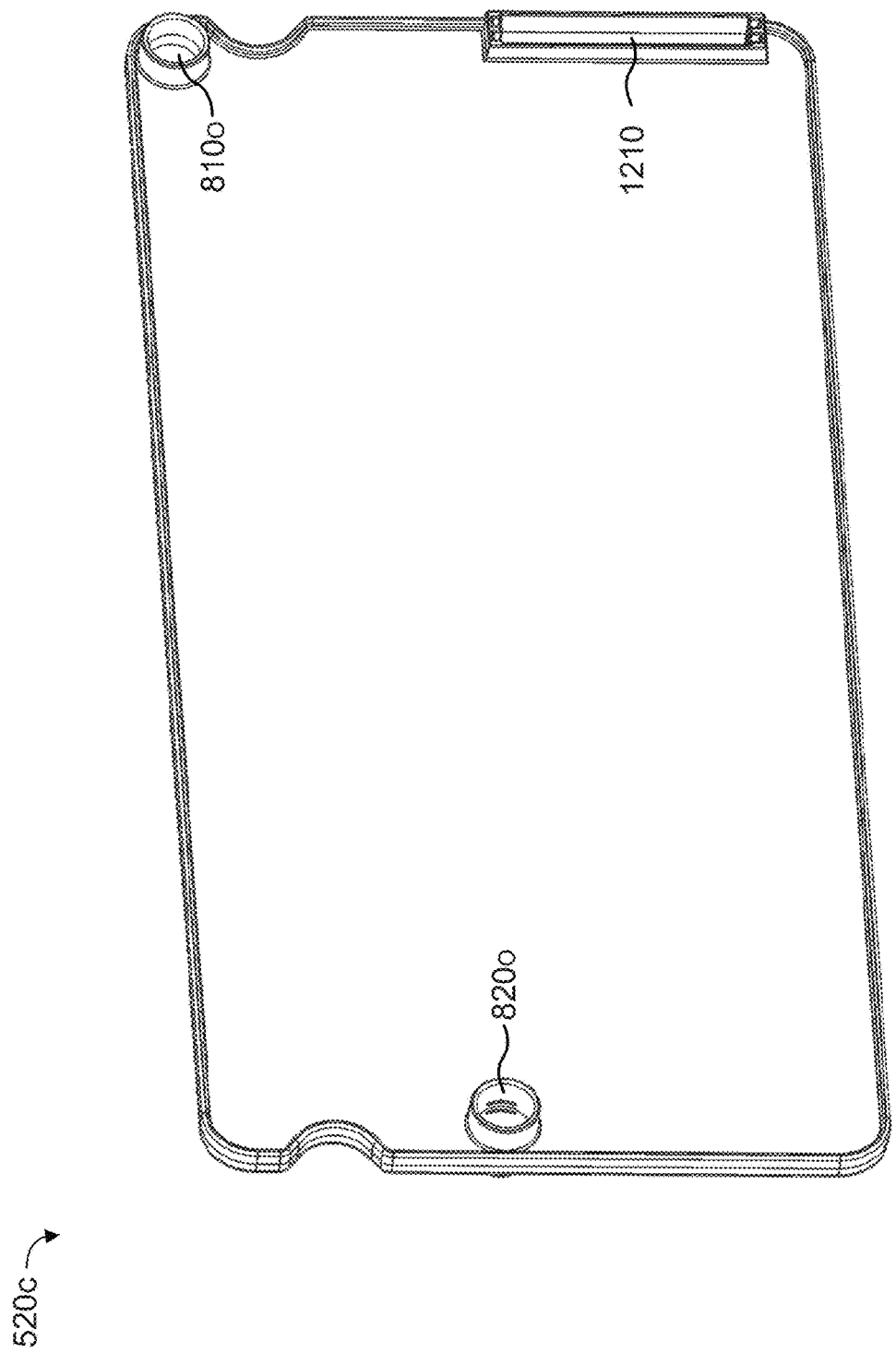
FIGS. 12A-C depict various perspective views of a blast plate, according to some embodiments.
Figure 12B:
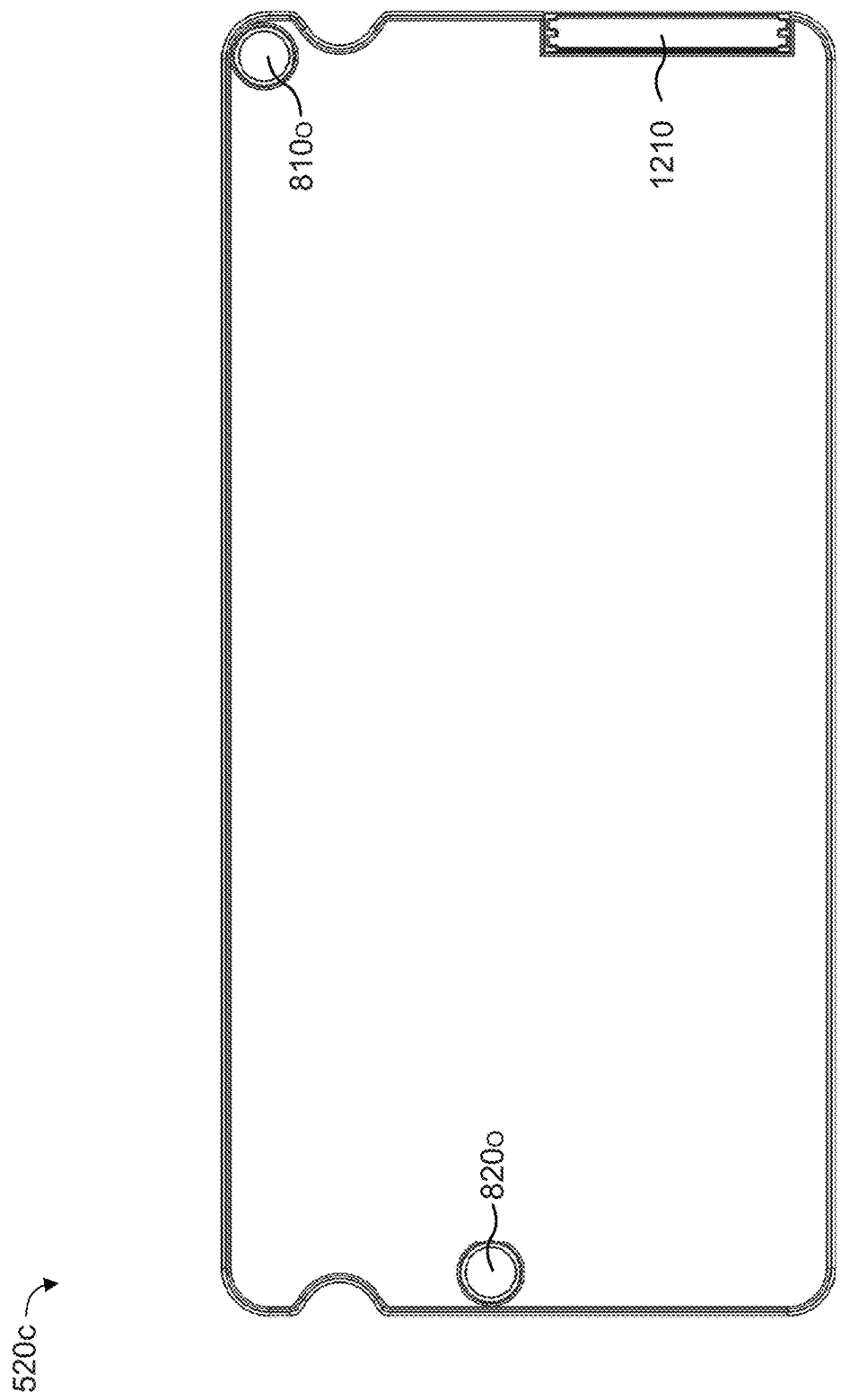
Figure 12C:
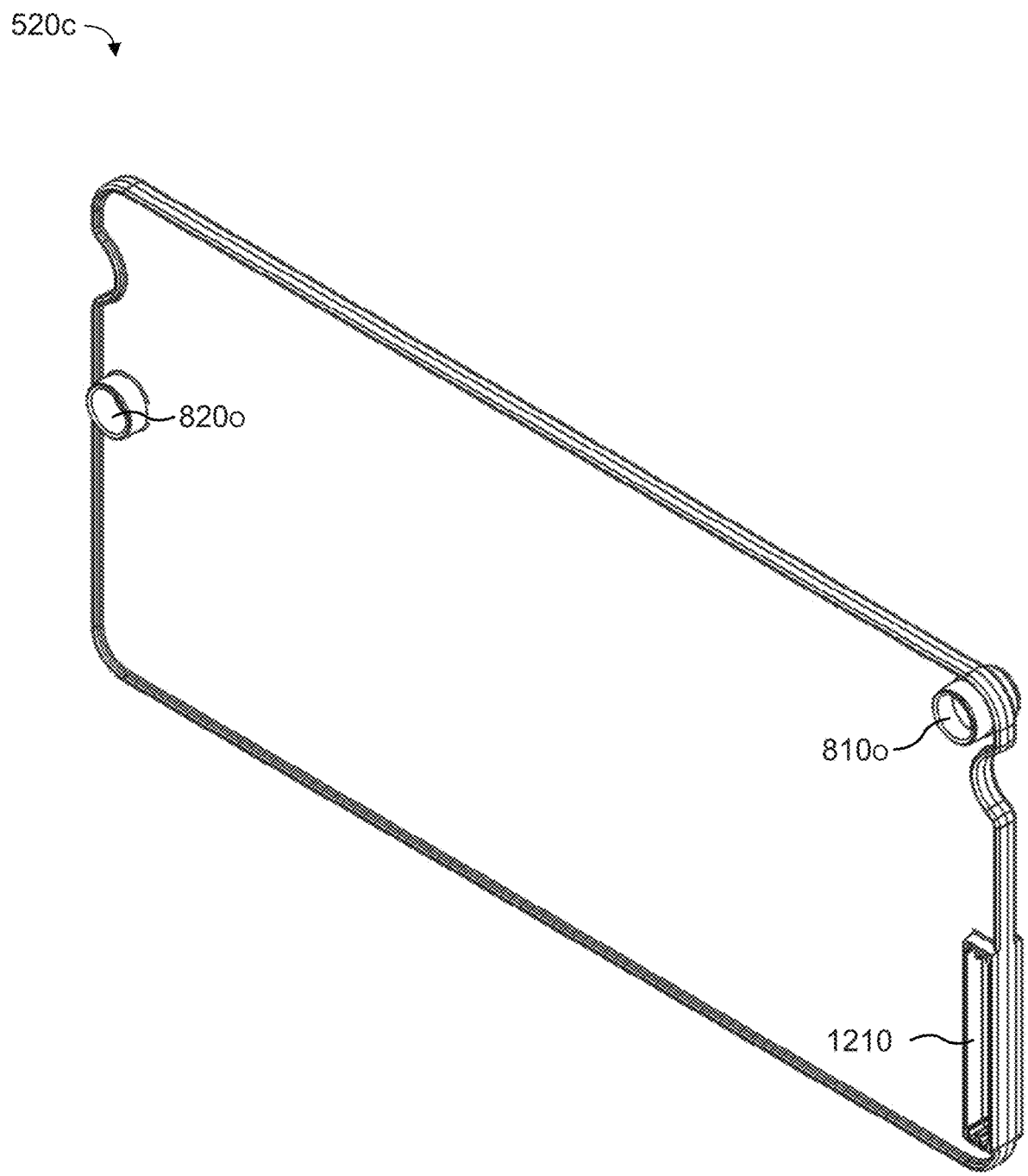

FIGS. 12A-C depict assorted views of center divider $520_C$. Center divider $520_C$ can include opening 8100 for coolant flow associated with main coolant output port 810 (FIG. 8) and/or opening $820_O$ for coolant flow associated with main coolant input port 820. Center divider $520_C$ can include opening 1210 which may be occupied by a section of telemetry module 1130. Center divider $520_C$ can comprise at least one of polycarbonate, polypropylene, acrylic, nylon, and acrylonitrile butadiene styrene (ABS). In exemplary embodiments, center divider $520_C$ can comprise one or more materials having low electrical conductivity or high electrical resistance, such as a dielectric constant or relative permittivity (e.g., $\varepsilon$ or $\kappa$) less than 15 and/or a volume resistance greater than $10^{10}$ ohm·cm, and/or low thermal conductivity (e.g., less than 1 W/m·° K).

Figure 13:
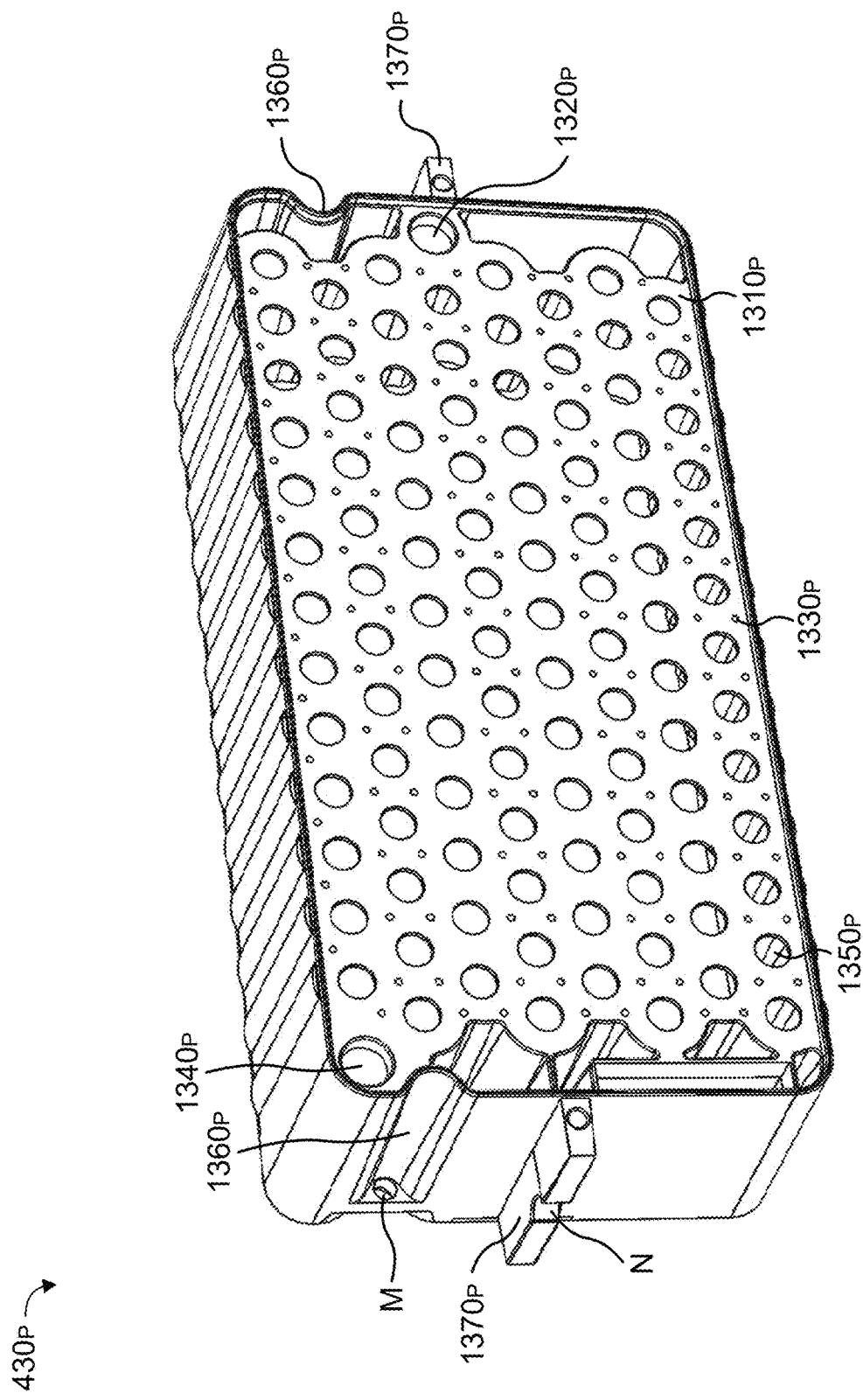
FIG. 13 illustrates a half shell, according to various embodiments.

FIG. 13 shows half shell $430_P$ according to some embodiments. Half shell $430_P$ (and $430_N$ shown in FIG. 11) can comprise at least one of polycarbonate, polypropylene, acrylic, nylon, and ABS. In exemplary embodiments, half shell $430_P$ (and $430_N$) can comprise one or more materials having low electrical conductivity or high electrical resistance, such as a dielectric constant or relative permittivity (e.g., $\varepsilon$ or $\kappa$) less than 15 and/or a volume resistance greater than $10^{10}$ ohm·cm, and/or low thermal conductivity (e.g., less than 1 W/m·° K).

Half shell $430_P$ can include base $1310_P$. In some embodiments, base $1310_P$ and the rest of half shell $430_P$ can be formed from a single mold. Base $1310_P$ can include channel $1340_P$ formed in half shell $430_P$ for coolant flow associated with main coolant output port 810 (FIG. 8) and/or channel $1320_P$ formed in half shell $430_P$ coolant flow associated with main coolant input port 820. Base $1310_P$ can include (small) holes $1330_P$. For example, the size and/or placement of holes $1330_P$ in base $1310_P$ can be optimized using computational fluid dynamics (CFD), such that each of holes $1330_P$ experiences the same inlet pressure (e.g., in a range of 0.05 pounds per square inch (psi)-5 psi), flow distribution of coolant through holes $1330_P$ is even, and the same volume flow (e.g., ±0.5 L/min in a range of 0.05 L/min-5 L/min) is maintained through each of holes $1330_P$. For example, holes $1330_P$ may each have substantially the same diameter (e.g., ±1 mm in a range of 0.5 mm to 5 mm). Such optimized size and/or placement of holes $1330_P$ in base $1310_P$ can contribute to even cooling of batteries $450_P$, since each of batteries $450_P$ experiences substantially the same volume flow of coolant.

In some embodiments, base $1310_P$ may contribute to retention of batteries $450_P$ in half module $410_C$. Base $1310_P$ can include battery holes $1350_P$ about which batteries $450_P$ are disposed (e.g., end 740 (FIG. 7) of one of battery cell 450 is positioned centered about one of battery holes $1350_P$). For example, at least some of batteries $450_P$ can be fixedly attached to base $1310_P$ using, for example, ultraviolet (UV) light curing adhesives, also known as light curing materials (LCM). Light curing adhesives can advantageously cure in as little as a second and many formulations can advantageously bond dissimilar materials and withstand harsh temperatures. Other adhesives can be used, such as synthetic thermosetting adhesives (e.g., epoxy, polyurethane, cyanoacrylate, and acrylic polymers).

Half shell $430_P$ can also include tabs $1370_P$ and gusset $1360_P$. Half shell $430_N$ (FIG. 11) can be a three-dimensional mirror image of half shell $430_P$. For example, half shell $430_N$ can include a base having a channel for coolant flow associated with main coolant output port 810 (FIG. 8) and/or a channel for coolant flow associated with main coolant input port 820, (small) holes, battery holes, tabs, and gusset that are three-dimensional mirror images of their respective half shell $430_P$ counterparts (e.g., base $1310_P$, channel $1340_P$ for coolant flow associated with main coolant output port 810 (FIG. 8), channel $1320_P$ for coolant flow associated with main coolant input port 820, (small) holes $1330_P$, battery holes $1350_P$, tabs $1370_P$, and gusset $1360_P$, respectively).

Gussets $1360_P$ and the corresponding gussets on half shell $430_N$ can include holes M. In some embodiments a portion of a tie rod (not shown in FIG. 13) can be in (occupy) gusset $1360_P$ and the corresponding gusset on half shell $430_N$, and pass through each hole M of half modules $410_C$ and $420_C$. For example, half modules $410_C$ and $420_C$ can each have two gussets on opposite sides of half shell $430_P$ and $430_N$ (respectively) and two tie rods, such that the two tie rods each go through two locations on a battery module $210_C$, providing four points of (secondary) retention. The rods can also hold two or more of battery modules $210a$ together when combined into string 212 (FIG. 2A), for retention and handling/moving.

Tabs $1370_P$ and the corresponding tabs on half shell $430_N$ can include cut out section N. Tabs $1370_P$ and the corresponding tabs on half shell $430_N$ can be used to laterally support two or more of battery modules $210_C$ coupled together, for example, as in string 212 (FIG. 2A) installed in enclosure 200 (FIG. 2B). For example, a retention plate (not shown in FIG. 13) may be placed over tabs $1370_P$ and the corresponding tabs on half shell $430_N$. A fastener (not depicted in FIG. 13) may affix the retention plate to a lateral extrusion 270 (FIG. 2B) in enclosure 200. The fastener can pass through cut out section N.

Referring back to FIG. 11, cell retainers $910_P$ and $910_N$ can contribute to structural support of batteries $450_P$ and $450_N$, respectively. For example, cell retainers $910_P$ and $910_N$ can keep or hold batteries $450_P$ and $450_N$ (respectively) in place. In some embodiments, at least some of batteries $450_P$ and $450_N$ can be fixedly attached to cell retainers $910_P$ and $910_N$ (respectively) using, for example, ultraviolet (UV) light curing adhesives or other adhesives, as described above in relation to FIG. 13. Cell retainers $910_P$ and $910_N$ can comprise at least one of polycarbonate, polypropylene, acrylic, and nylon, and ABS. In exemplary embodiments, cell retainers $910_P$ and $910_N$ can comprise one or more materials having low electrical conductivity or high electrical resistance, such as a dielectric constant or relative permittivity (e.g., ε or κ) less than 15 and/or a volume resistance greater than $10^{10}$ ohm·cm, and/or low thermal conductivity (e.g., less than 1 W/m·° K). Cell retainers $910_P$ and $910_N$ can also contribute to structural support of flexible circuit $510_P$ and $510_N$, respectively. For example, cell retainers $910_P$ and $910_N$ can hold flexible circuit $510_P$ and $510_N$, respectively.

Flexible circuit $510_P$ can include power bud $J_P$ and flexible circuit $510_N$ can include power socket $J_N$. Power bud $J_P$ and power socket $J_N$ were described in relation to main power connector 460 (FIG. 4). Power bud $J_P$ can be brazed onto flexible circuit $510_P$ and power socket $J_N$ can be brazed onto flexible circuit $510_N$. Power bud $J_P$ and power socket $J_N$ can comprise any conductor, such as aluminum (alloy) and/or copper (alloy). Power bud $J_P$ and power socket $J_N$ can include conductive ring $K_P$ and $K_N$, respectively. Conductive ring $K_P$ and $K_N$ can be placed into (attached to) hole $L_P$ and $L_N$ (respectively) of cell retainer $910_P$ and $910_N$, respectively. In this way, conductive ring $K_P$ and $K_N$ can provide a larger surface area for attaching flexible circuit $510_P$ and $510_N$ (respectively) to cell retainer $910_P$ and $910_N$, respectively. Conductive ring $K_P$ and $K_N$ can comprise any conductor, such as aluminum (alloy) and copper (alloy). In some embodiments, conductive ring $K_P$ and $K_N$ can comprise the same material as power bud $J_P$ and power socket $J_N$, respectively.

Module cover $1110_P$ can include male main power connector $460_M$, male main coolant output port $810_M$, male main coolant input port $820_M$ (not shown in FIG. 11), and male communications and low power connector $830_M$. Module cover $1110_N$ can include female main power connector $460_F$, female main coolant output port $810_F$, female main coolant input port $820_F$, and female communications and low power connector $830_F$. Male main power connector $460_M$, female main power connector $460_F$, male main coolant output port $810_M$, female main coolant output port $810_F$, male main coolant input port $820_M$, female main coolant input port $820_F$, male communications and low power connector $830_M$, female communications and low power connector $830_F$ were described in relation to FIG. 10A. In various embodiments, half module $410_C$ is a "positive" end of battery module $210_C$ and half module $420_C$ is a "negative" end of battery module $210_C$.

Module covers $1110_P$ and $1110_N$ can comprise at least one of polycarbonate, polypropylene, acrylic, nylon, and ABS. In exemplary embodiments, module covers $1110_P$ and $1110_N$ can comprise one or more materials having low electrical conductivity or high electrical resistance, such as a dielectric constant or relative permittivity (e.g., ε or κ) less than 15 and/or a volume resistance greater than $10^{10}$ ohm·cm, and/or low thermal conductivity (e.g., less than 1 W/m·° K).

Figure 14:
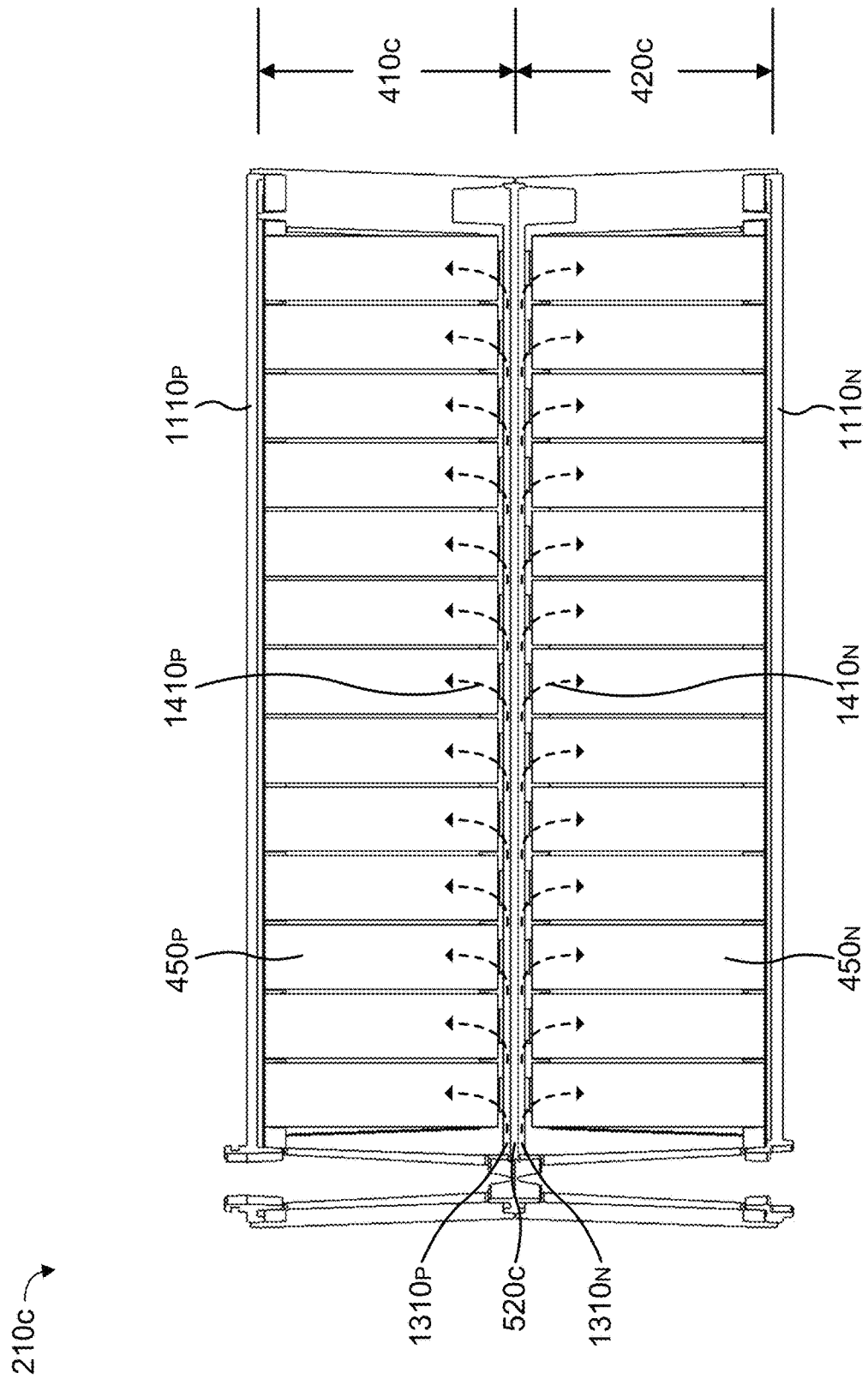
FIG. 14 depicts a cross-sectional view of a battery module, in accordance with some embodiments.

FIG. 14 illustrates a cross-sectional view of battery module $210_C$. FIG. 14 depicts half modules $410_C$ and $420_C$ coupled to form battery module $210_C$. Center divider $520_C$ can be disposed between half modules $410_C$ and $420_C$. Half modules $410_C$ and $420_C$ can include base $1310_P$ and $1310_N$, battery cells $450_P$ and $450_N$, and module cover $1110_P$ and $1110_N$, respectively.

Referring back to FIG. 11, in operation coolant can enter or flow into battery module $210_C$ at male main coolant input port $820_M$ (not depicted in FIG. 11, see FIG. 10A). For example, a pump (not shown in FIG. 11) can pump coolant through battery module $210_C$, such that the coolant pressure is on the order of less than 5 pounds per square inch (psi), for example, about 0.7 psi. Coolant can travel through channel $1320_P$ (FIG. 13) to center divider $520_C$, where the coolant (flow) can be divided between half modules $410_C$ and $420_C$ (e.g., such that there is a first coolant flow for half module $410_C$ (represented as dashed lines $1410_P$ in FIG. 14) and a second coolant flow for half module $420_C$ (represented as dashed lines $1410_N$ in FIG. 14)).

At base $1310_P$ (FIG. 13) and base $1310_N$ (not depicted in FIG. 13), the divided coolant flows through holes $1330_P$ and $1330_N$ (not depicted in FIG. 13) (respectively) and toward module covers $1110_P$ and $1110_N$, respectively. In half module $410_C$, toward module cover $1110_P$ coolant can enter channel $1340_P$, flow through channel $1340_N$ (not depicted in FIG. 13) in half module $420_C$, and exit battery module $210_C$ at female main coolant output port $810_F$. In half module $420_C$, toward module cover $1110_N$, the coolant exits battery module $210_C$ at female main coolant output port $810_F$. In various embodiments, channels $1320_P$, $1340_P$, $1320_N$ (not depicted in FIG. 13), and $1340_N$ are structured such that coolant flow is not "short circuited" (e.g., coolant flows from $1320_P$ to $1340_P$ and/or from $1320_N$ to $1340_N$ without passing through base $1310_P$ and/or $1310_N$ (respectively)) to battery cells $450_P$ and $450_N$ (respectively)). By way of non-limiting example, center divider $520_C$ can be structured such that coolant (flow) is evenly divided between half modules $410_C$ and $420_C$. By way of further non-limiting example, base $1310_P$ and/or base $1310_N$ can be structured (e.g., size and position of holes $1330_P$ and $1330_N$) such that coolant flows evenly through holes $1330_P$ and $1330_N$. In some embodiments, the first coolant flow flows over the battery cells in a first direction within half module $410_C$ (represented as dashed lines $1410_P$ in FIG. 14), and the second coolant flow flows over the battery cells in a second direction within half module $420_C$ (represented as dashed lines $1410_N$ in FIG. 14). The first direction and the second direction can be (substantially) the opposite of each other.

According to some embodiments, the coolant can comprise any non-conductive fluid that will inhibit ionic transfer and have a high heat or thermal capacity (e.g., at least 60 J/(mol K) at 90° C.). For example, the coolant can be at least one of: synthetic oil, water and ethylene glycol (WEG), poly-alpha-olefin (or poly-α-olefin, also abbreviated as PAO) oil, liquid dielectric cooling based on phase change, and the like. By way of further non-limiting example, the coolant may be at least one of: perfluorohexane (Flutec PP1), perfluoromethylcyclohexane (Flutec PP2), Perfluoro-1,3-dimethylcyclohexane (Flutec PP3), perfluorodecalin (Flutec PP6), perfluoromethyldecalin (Flutec PP9), trichlorofluoromethane (Freon 11), trichlorotrifluoroethane (Freon 113), methanol (methyl alcohol 283-403K), ethanol (ethyl alcohol 273-403K), and the like.

In various embodiments, half shell $430_P$ and $430_N$ can comprise an opaque (e.g., absorptive of laser light) material such as at least one of polycarbonate, polypropylene, acrylic, nylon, and ABS. In some embodiments, center divider $520_C$, cell retainers $910_P$ and $910_N$, and module covers $1110_P$ and $1110_N$ can each comprise a (different) transparent (e.g., transmissive of laser light) material such as polycarbonate, polypropylene, acrylic, nylon, and ABS. In exemplary embodiments, half shell $430_P$ and $430_N$, center divider $520_C$, cell retainers $910_P$ and $910_N$, and module covers $1110_P$ and $1110_N$ all comprise the same material, advantageously simplifying a laser welding schedule.

Half shell $430_P$ and $430_N$ can be joined to center divider $520_C$, cell retainers $910_P$ and $910_N$, and module covers $1110_P$ and $1110_N$ using laser welding, where two of the parts are put under pressure while a laser beam moves along a joining line. The laser beam can pass through the transparent part and be absorbed by the opaque part to generate enough heat to soften the interface between the parts creating a permanent weld. Semiconductor diode lasers having wavelengths on the order of 808 nm to 980 nm and power levels from less than 1 W to 100 W can be used, depending on the materials, thickness, and desired process speed. Laser welding offers the advantages of being cleaner than adhesive bonding, having no micro-nozzles to get clogged, having no liquid or fumes to affect surface finish, having no consumables, having higher throughput than other bonding methods, providing access to pieces having challenging geometries, and having a high level of process control. Other welding methods, such as ultrasonic welding, can be used.

Figure 15:
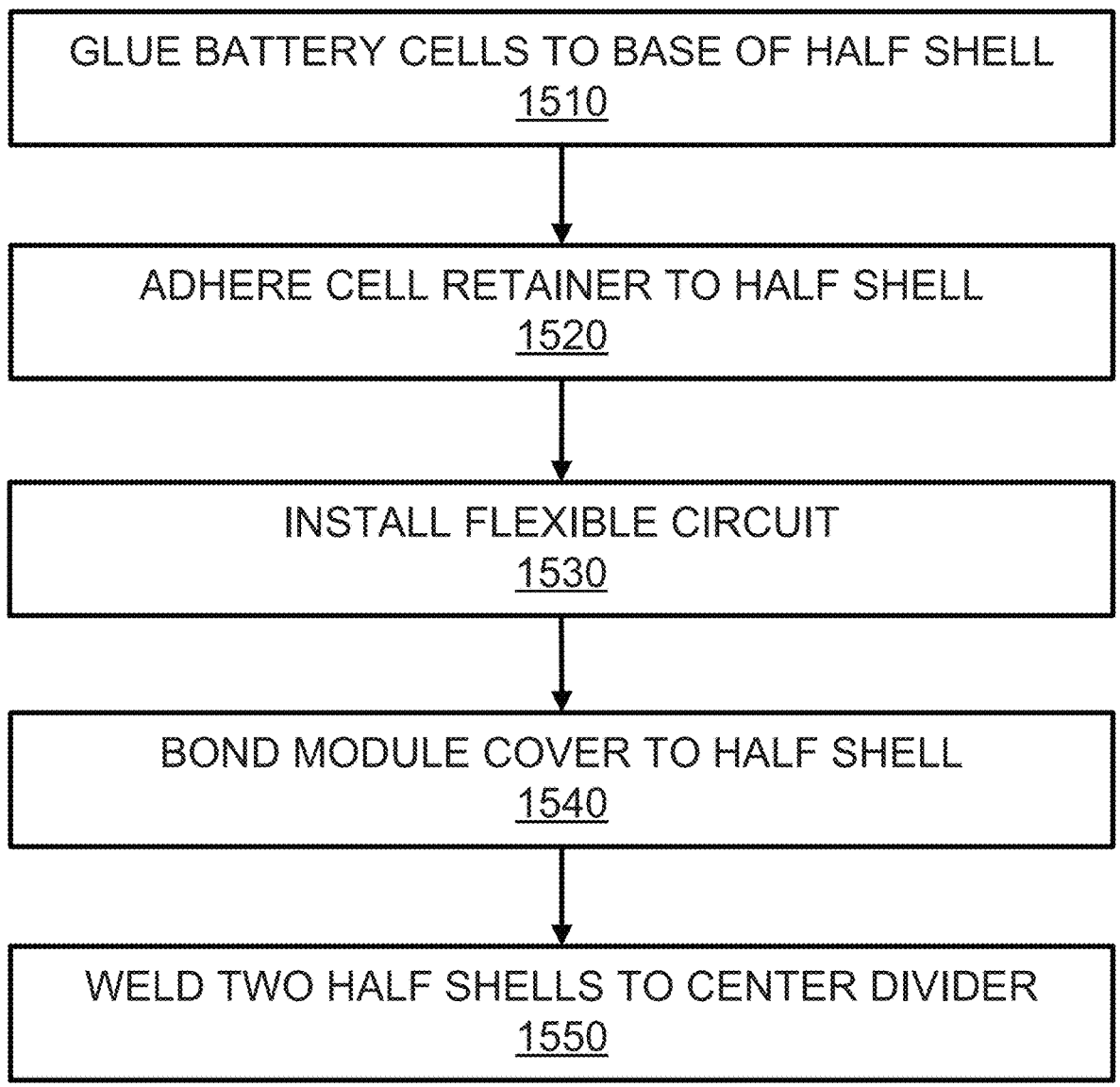
FIG. 15 shows a simplified flow diagram for a process for assembling a battery module, according to some embodiments.

FIG. 15 depicts a simplified flow diagram for a process 1500 for assembling battery module $210_C$. Although the steps comprising process 1500 are shown in a certain sequence, they may be performed in any order. Additionally, assorted combinations of the steps may be performed concurrently. In exemplary embodiments, process 1500 can produce hermetic seals at each of the fluid boundary areas of battery module $210_C$: half shell $430_P$ and $430_N$, center divider $520_C$, and module covers $1110_P$ and $1110_N$.

At step 1510, at least some of battery cells $450_P$ (and $450_N$) can be fixedly attached to base $1310_P$ (and base $1310_N$ (not depicted in FIG. 13) of half shell $430_N$), as described above in relation to FIG. 13. At step 1520, cell retainers $910_P$ and $910_N$ can be coupled to half shells $430_P$ and $430_N$, respectively. For example, cell retainers $910_P$ and $910_N$ can be at least one of laser welded, ultrasonic welded, and glued (e.g., using one or more synthetic thermosetting adhesives) to half shells $430_P$ and $430_N$, respectively.

At step 1530, flexible circuits $510_P$ and $510_N$ can be installed in half shells $430_P$ and $430_N$, respectively. For example, flexible circuits $510_P$ and $510_N$ can be hot staked to cell retainers $910_P$ and $910_N$ and/or half shells $430_P$ and $430_N$, respectively. At step 1540, module covers $1110_P$ and $1110_N$ can be bonded to half shells $430_P$ and $430_N$, respectively. For example, module covers $1110_P$ and $1110_N$ can be at least one of laser welded, ultrasonic welded, and glued (e.g., using one or more synthetic thermosetting adhesives) to half shells $430_P$ and $430_N$, respectively.

At step 1550, center divider $520_C$ can be attached to half shells $430_P$ and $430_N$. For example, center divider $520_C$ can be at least one of laser welded, ultrasonic welded, and glued (e.g., using one or more synthetic thermosetting adhesives) to half shells $430_P$ and $430_N$.

As would be readily appreciated by one of ordinary skill in the art, various embodiments described herein may be used in additional applications, such as in energy-storage systems for wind and solar power generation. Other applications are also possible.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A battery comprising a plurality of battery modules fluidically coupled in series along a linear liquid coolant flow path, each battery module of the plurality of battery modules fluidically coupled in series comprising:
an enclosure having a base, the base having a plurality of first holes disposed therein, the base configured to support a plurality of cylindrical cells at a first end of each cell, the cylindrical cells having cylinder axes parallel to the linear liquid coolant flow path, the enclosure including a coolant input port and a coolant output port; the enclosure having a coolant sub-system for circulating coolant being directed into the enclosure through the coolant input port and the plurality of first holes and out of the enclosure through the coolant output port, wherein the enclosure further includes a channel connected to a channel of an adjacent one of the plurality of battery modules to define a contiguous linear portion of the linear liquid coolant flow path parallel to the cylinder axes of the cylindrical cells;
a center divider affixed to the enclosure;
a module cover coupled to the enclosure at an opposite end of the module from the center divider;
a retainer coupled to the enclosure at a location within the enclosure and spaced from the base to define a coolant flow area, the retainer comprising a retainer plate having a plurality of circular retainer holes extending therethrough, the circular retainer holes configured to support the plurality of cells at a second end of each cell opposite the first end;

a current carrier disposed between the module cover and the retainer; and the plurality of cells disposed between the current carrier and the center divider, the cells being coupled to and supported by the retainer.

2. The battery of claim 1, wherein the plurality of first holes each have a diameter in a range from 0.1 mm-5 mm.

3. The battery of claim 2, wherein the plurality of first holes are disposed on the base such that each first hole of the plurality of first holes receives substantially the same inlet pressure and approximately the same volume flow is maintained through each first hole.

4. The battery of claim 3, wherein the substantially same inlet pressure is in a range of 0.05 psi-5 psi and the approximately same volume flow is 0.05 L/min-5 L/min.

5. The battery of claim 1, wherein the module cover, the enclosure, and the center divider are each comprised of at least one of: polycarbonate, polypropylene, acrylic, nylon, and acrylonitrile butadiene styrene (ABS), and the module cover and the center divider are each affixed to the enclosure, forming a hermetic seal.

6. The battery of claim 1, wherein the module cover and center divider comprise laser-transmissive polycarbonate, the enclosure comprises laser-absorptive polycarbonate, and the module cover and the center divider are each affixed to the enclosure, forming a hermetic seal.

7. The battery of claim 1 further comprising:

a tray having the plurality of modules disposed therein, the tray including:

a positive bus bar;

a negative bus bar, the positive and negative bus bars being separately electrically coupled to the power connectors associated with the plurality of modules; and a plurality of lateral supports; and a coolant system for circulating coolant being pumped into the tray such that each of the modules is at approximately the same predetermined temperature.

8. The battery of claim 1, wherein the retainer includes a plurality of second holes configured to direct the coolant from the base of the enclosure to the current carrier.

9. The battery of claim 8, wherein the current carrier includes a plurality of third holes configured to direct the coolant outside of the enclosure.

10. The battery of claim 9, wherein the plurality of second holes and the plurality of third holes are substantially aligned.

11. The battery of claim 1, wherein the current carrier is coupled to the retainer through a plurality of stubs formed on the retainer.

12. The battery of claim 1, wherein at least some of the cells are fixedly attached to the retainer by an adhesive.

13. The battery of claim 1, wherein the retainer further comprises a first coolant hole extending through the retainer plate to form a coolant flow path in communication with the coolant input port and a second coolant hole extending through the retainer plate to form a coolant flow path in communication with the coolant output port.

* * * * *

UNITED STATES PATENT AND TRADEMARK OFFICE
CERTIFICATE OF CORRECTION

PATENT NO.         : 11,108,100 B2
APPLICATION NO.    : 14/946699
DATED              : August 31, 2021
INVENTOR(S)        : W. Porter Harris et al.

Page 1 of 1

It is certified that error appears in the above-identified patent and that said Letters Patent is hereby corrected as shown below:

On the Title Page

Column 1, Item (71), Line 1, under Applicant, delete "Faraday & Future Inc.," and insert --Faraday&Future Inc.,--.

Column 1, Item (73), Line 1, under Assignee, delete "Faraday & Future Inc.," and insert --Faraday&Future Inc.,--.

In the Specification

In Column 9, Line 42, delete "FIGS." and insert --FIG.--.

In Column 10, Line 2, delete "8100" and insert --810$_O$--.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*